US 12,234,840 B2

(12) United States Patent
Kumagai et al.

(10) Patent No.: US 12,234,840 B2
(45) Date of Patent: Feb. 25, 2025

(54) JET PUMP SYSTEM

(71) Applicant: Honeywell International Inc., Charlotte, NC (US)

(72) Inventors: Gary Kumagai, Walnut, CA (US); Robert Lamb, Yeovil (GB); Steven Goddard, Yeovil (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/318,460

(22) Filed: May 16, 2023

(65) Prior Publication Data

US 2023/0392615 A1    Dec. 7, 2023

Related U.S. Application Data

(60) Provisional application No. 63/365,954, filed on Jun. 7, 2022.

(51) Int. Cl.
*F04F 5/54* (2006.01)
*F02C 7/047* (2006.01)

(52) U.S. Cl.
CPC ............... *F04F 5/54* (2013.01); *F02C 7/047* (2013.01)

(58) Field of Classification Search
CPC ...... F04F 5/54; F02C 7/04; F02C 7/12; F02C 7/14; F02C 7/143; F02C 7/18; F02C 7/185; F02C 6/08; F02C 6/18
See application file for complete search history.

(56) References Cited

U.S. PATENT DOCUMENTS

| 1,421,843 | A | 7/1922 | Schmidt |
| 3,367,256 | A | 2/1968 | Townsend et al. |
| 3,441,045 | A | 4/1969 | Malone |
| 4,285,466 | A | 8/1981 | Linscheid et al. |
| 6,550,253 | B2 * | 4/2003 | Mortzheim ............... F02C 7/18 60/782 |

(Continued)

FOREIGN PATENT DOCUMENTS

| DE | 102007004590 A1 * | 7/2008 | .............. F04F 5/466 |
| EP | 1795710 A2 | 6/2007 | |

(Continued)

OTHER PUBLICATIONS

Extended Search Report from counterpart European Application No. 23177694.9 dated Nov. 6, 2023, 6 pp.

(Continued)

*Primary Examiner* — Craig Kim
(74) *Attorney, Agent, or Firm* — Shumaker & Sieffert, P.A.

(57) ABSTRACT

A bleed system including control circuitry and a variable jet pump. The control circuitry is configured to receive a signal indicative of a fluid parameter in the bleed system and cause the jet pump to alter a mixing ratio of a higher pressure gas and a lower pressure gas based on the signal. The jet pump is configured to combine the lower pressure gas and the higher pressure gas in the mixing ratio to generate a mixed gas. The jet pump is configured to supply the mixed gas to one or more gas loads in the bleed system. In examples, the control circuitry is configured to establish a system setpoint for the fluid parameter based on an operating status of the one or more gas loads.

20 Claims, 7 Drawing Sheets

(56) References Cited

U.S. PATENT DOCUMENTS

| | | | |
|---|---|---|---|
| 6,615,574 B1* | 9/2003 | Marks | F02C 9/18 |
| | | | 60/772 |
| 6,701,715 B2 | 3/2004 | Anderson et al. | |
| 7,306,644 B2 | 12/2007 | Leigh et al. | |
| 7,823,390 B2* | 11/2010 | Eluripati | F01D 25/12 |
| | | | 60/39.23 |
| 8,015,826 B2* | 9/2011 | Myers | F01K 13/02 |
| | | | 60/785 |
| 8,057,157 B2* | 11/2011 | Roush | F02C 6/08 |
| | | | 415/116 |
| 8,099,973 B2 | 1/2012 | Sampson et al. | |
| 8,142,169 B2* | 3/2012 | Whaling | F02C 6/08 |
| | | | 417/189 |
| 8,505,310 B2* | 8/2013 | Zhang | F02C 6/08 |
| | | | 60/785 |
| 8,672,644 B2 | 3/2014 | Kidd | |
| 8,985,966 B2 | 3/2015 | Sampson et al. | |
| 9,260,974 B2 | 2/2016 | Hasting et al. | |
| 9,366,194 B2* | 6/2016 | Feigl | F02C 9/18 |
| 10,487,734 B2* | 11/2019 | Munsell | F02C 6/08 |
| 10,625,868 B2* | 4/2020 | daSilva | F04F 5/20 |
| 11,067,007 B2* | 7/2021 | Kitaguchi | F02C 7/26 |
| 11,117,669 B2 | 9/2021 | Fletcher et al. | |
| 2003/0046938 A1* | 3/2003 | Mortzheim | F01D 25/12 |
| | | | 60/782 |
| 2003/0205049 A1 | 11/2003 | Anderson et al. | |
| 2007/0125092 A1 | 6/2007 | Wolfe et al. | |
| 2008/0118371 A1 | 5/2008 | Vasquez et al. | |
| 2008/0247881 A1 | 10/2008 | Sampson et al. | |
| 2010/0170265 A1* | 7/2010 | Whaling | F02C 6/08 |
| | | | 60/785 |
| 2012/0117977 A1 | 5/2012 | Childers et al. | |
| 2013/0192250 A1 | 8/2013 | Glahn et al. | |
| 2014/0255218 A1 | 9/2014 | Sarshar et al. | |
| 2015/0059350 A1 | 3/2015 | Kolvick et al. | |
| 2015/0125260 A1* | 5/2015 | Kashima | F02C 7/12 |
| | | | 415/1 |
| 2016/0138472 A1 | 5/2016 | Chartier et al. | |
| 2016/0222986 A1 | 8/2016 | Mason et al. | |
| 2017/0074172 A1* | 3/2017 | Little | F02C 7/18 |
| 2017/0218852 A1 | 8/2017 | Klosinski et al. | |
| 2018/0312262 A1 | 11/2018 | Wiegers et al. | |
| 2019/0153963 A1 | 5/2019 | Kitaguchi | |
| 2020/0292099 A1* | 9/2020 | Li | F04F 5/461 |
| 2022/0381181 A1 | 12/2022 | Briley | |
| 2023/0392615 A1* | 12/2023 | Kumagai | F02C 6/08 |

FOREIGN PATENT DOCUMENTS

| | | |
|---|---|---|
| EP | 1923553 A2 | 5/2008 |
| EP | 3219956 A2 | 9/2017 |
| JP | 4882471 B2 | 2/2012 |
| WO | 2013169313 A1 | 11/2013 |
| WO | 2022122247 A1 | 6/2022 |

OTHER PUBLICATIONS

Response to Extended Search Report dated Nov. 6, 2023, from counterpart European Application No. 23177694.9 filed Dec. 8, 2023, 66 pp.

* cited by examiner

JET PUMP SYSTEM

This application claims the benefit of U.S. Provisional Patent Application Ser. No. 63/365,954 (filed Jun. 7, 2022), which is entitled, "JET PUMP SYSTEM" and is incorporated by reference herein in its entirety.

The project leading to this invention has received funding from the UK ATi under Innovate UK Project No.: 46772.

TECHNICAL FIELD

The present disclosure relates to a bleed system, such as a bleed air system on-board an aircraft.

BACKGROUND

Bleed systems are used to extract pressurized air from turbine engines for various uses, including supplying auxiliary power, cooling air, and other air loads served by the system. For example, aircraft bleed systems may extract pressurized air from a turbine engine supplying thrust to the aircraft to provide air to various air loads and air-use systems, such as to an environmental control system configured to pressurize a cabin of the aircraft, an air drive unit configured to pressurize hydraulics, an anti-icing system configured to remove and/or limit ice on a wing of the aircraft, an inert gas generating system configured to pressurize a tank system of the aircraft, and other air loads The bleed system provides the bleed air at a pressure, temperature, and mass flow sufficient to ensure an adequate bleed air supply to the served loads.

SUMMARY

The present disclosure describes a bleed system (also referred to herein as a bleed air system) that includes control circuitry and a jet pump system. The jet pump system is configured to receive a relatively low pressure gas ("lower pressure gas") and a higher pressure gas from a turbine engine. In some examples, the lower pressure gas and the higher pressure gas may be air and the turbine engine may be an aircraft turbine configured to provide thrust to an aircraft. The jet pump system is configured to combine the lower pressure gas and the higher pressure gas in a system mixing ratio to generate a mixed gas at an intermediate pressure and temperature, which may be supplied to one or more gas loads served by the bleed system. In examples, the jet pump system includes a plurality of jet pump assemblies. The jet pump system may be configured to provide an individual flow of the lower pressure gas and an individual flow of the higher pressure gas to each jet pump assembly. Each jet pump assembly may be configured to combine the individual flows received in a mix proportion and issue a discharge gas stream. The jet pump system may be configured to merge each discharge gas stream produced by each jet pump assembly to generate the mixed gas.

The control circuitry is configured to receive a signal indicative of a fluid parameter (e.g., a pressure, a temperature, and/or a flow rate) in the bleed system and cause the jet pump system to alter the system mixing ratio based on the signal. In examples, the jet pump system is configured to alter the mix proportion of one or more jet pump assemblies to alter the system mixing ratio. For example, the control circuitry may compare the indicated fluid parameter to a system setpoint and cause the jet pump system to alter the system mixing ratio based on the comparison.

In some examples, the control circuitry is configured to establish the system setpoint for the fluid parameter based on an operating status of the one or more gas loads served by the bleed system, such that the jet pump extracts an amount of the higher pressure gas and the lower pressure gas from the turbine engine based on the combined gas demand of operating gas loads.

In an example, a system comprises: a jet pump system configured to receive a lower pressure gas from a lower pressure stage of a turbine engine and receive a higher pressure gas from a higher pressure stage of the turbine engine, the jet pump system comprising: a first jet pump assembly configured to combine a first portion of the lower pressure gas and a first portion of the higher pressure gas to produce a first discharge gas stream, wherein the first jet pump assembly is configured alter a first mix proportion of the portion of the higher pressure gas to the portion of the lower pressure gas combined to produce the first discharge gas stream, and a second jet pump assembly configured to combine a second portion of the lower pressure gas and a second portion of the higher pressure gas to produce a second discharge gas stream, wherein the second jet pump assembly is configured alter a second mix proportion of the second portion of the higher pressure gas to the second portion of the lower pressure gas combined to produce the second discharge gas stream, and wherein the jet pump system is configured to mix the first discharge gas stream and the second discharge gas stream to produce a mixed gas; and control circuitry configured to receive a signal indicative of a fluid parameter of the mixed gas, wherein the control circuitry is configured to cause the jet pump system to alter at least one of the first mix proportion or the second mix proportion based on the signal.

The details of one or more examples are set forth in the accompanying drawings and the description below. Other features, objects, and advantages will be apparent from the description and drawings, and from the claims.

DETAILED DESCRIPTION

Figure 1:
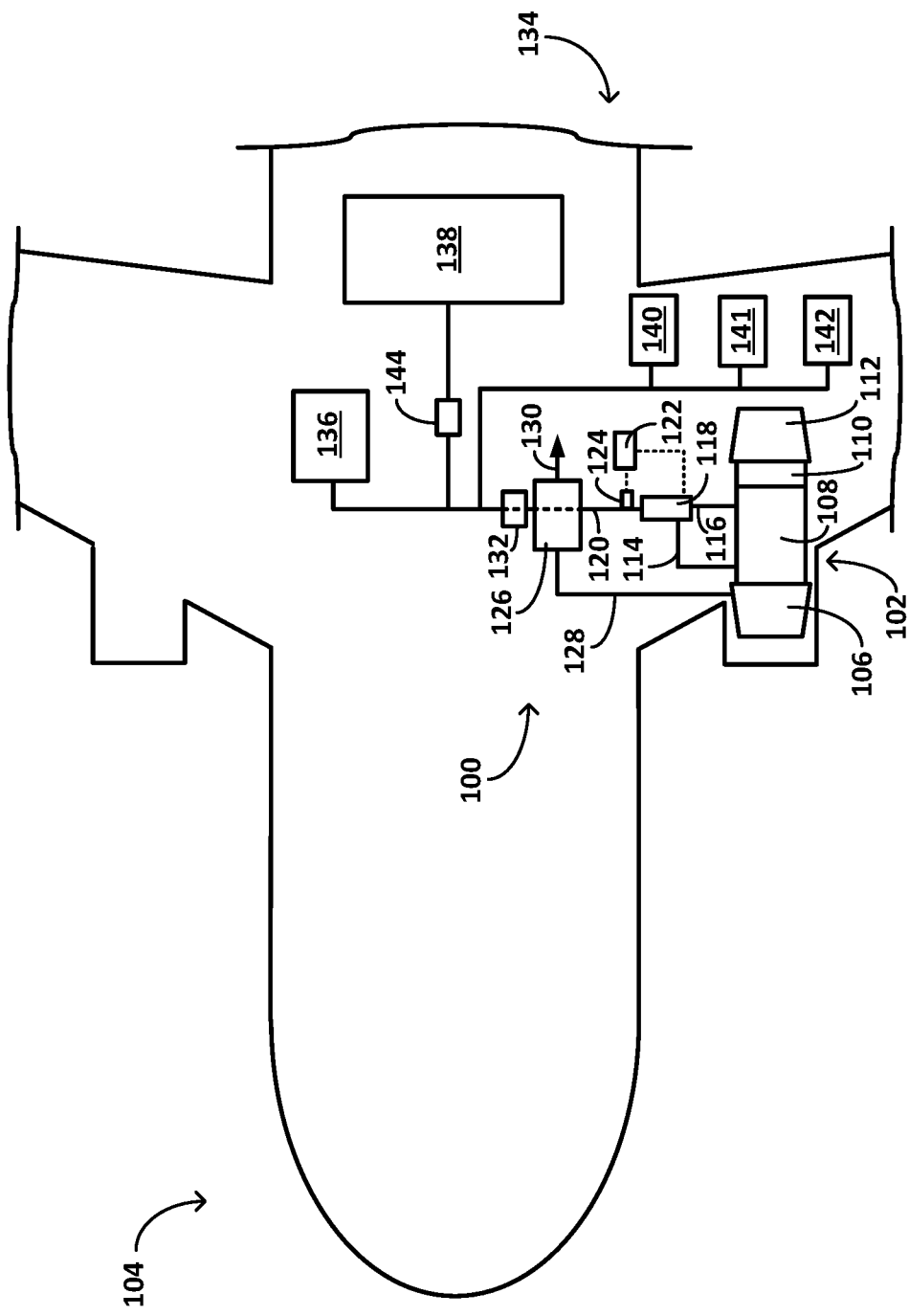
FIG. 1 is a schematic illustration of an example bleed system of an aircraft.

Turbine engines (e.g., gas turbines) generally intake and compress a gas such as air in a compressor section prior using the gas to combust fuel for engine thrust. The compressor section generally receives the gas (e.g., air) through an intake and compresses the gas using a series of compressor stages. The compressor stages progressively increase the gas pressure, in order to provide the gas in sufficient quantity and pressure to a combustion section. The combustion section mixes the gas and a fuel and causes a combustion. The combustion generates rapidly expanding combustion gases which may be utilized to rotate a turbine shaft and/or produce engine thrust. In aircraft engines, in addition to causing some amount of shaft rotation to drive the compressor section, the combustion gases are ejected through an exhaust section to generate engine thrust for the aircraft.

In some cases, a portion of the compressed gas is diverted from the compressor section of the turbine engine as a bleed gas (e.g., bleed air) prior to entering the combustion section. The bleed gas may be extracted from the compressor section and provided to a bleed system configured to distribute the bleed gas to various gas loads (also referred to as air loads in some examples) operating elsewhere in the system. For example, bleed gas may be extracted from one or more compressor stages of a turbine engine during aircraft flight to support applications such as one or more of an Environmental Control System (ECS) system of a passenger cabin, wing anti-icing, air-driven motors, hydraulic pressurization, fuel tank pressurization, or other uses. The bleed system may use a network of ducts, valves, regulators, and other components to route the bleed gas from the compressor section of the turbine engine to various locations within the aircraft. The bleed system is typically configured to extract sufficient bleed gas from the turbine engine to substantially maintain the air pressure in the distribution system within a specific pressure range.

In some bleed air systems, bleed gas is extracted from multiple compressor stages of the turbine engine in order to provide sufficient gas to the one or more gas loads served. For example, the bleed system may be configured to extract a relatively low pressure air ("lower pressure air") from an initial compressor stage and a relatively high pressure air ("higher pressure air") from a subsequent compressor stage. The lower pressure air has a lower pressure than the higher pressure air. For example, the lower pressure gas may be intermediate pressure air ("IP air") from an intermediate compressor stage of a turbine engine and the higher pressure gas may be high pressure air ("HP air") from a high compressor stage of the turbine engine. The higher pressure gas extracted from the subsequent compressor stage generally has a higher pressure and temperature than the lower pressure gas air extracted from the initial compressor stage. As a non-limiting example, in the context of some aircraft, the higher pressure gas may be at about 47.63 Atmospheres (about 700 pounds per square inch (psi)) and a temperature of 1000-1400 degrees Fahrenheit (about 538-760 degrees Celsius) and the lower pressure gas may be at 500-700 degrees Fahrenheit (about 260-371 degrees Celsius).

The bleed system may be configured to mix the higher pressure gas and the lower pressure gas in order to maintain the gas supply to the operating loads. For example, in some bleed systems, when the lower pressure gas (e.g., the IP air) extracted is insufficient to meet the operating requirements of the served gas loads (e.g., at lower engine power), the bleed system may be configured to extract and mix the higher pressure gas (e.g., the HP air) with the lower pressure gas to maintain a sufficient gas supply to the gas loads.

In some examples, the bleed system is configured to adjust the relative amounts of higher pressure gas and lower pressure gas extracted by monitoring a control variable, such as a pressure and/or temperature of the mixed gas within the bleed system. The control variable may be sensed by sensors positioned at one or more specific fixed locations in the bleed system, such as a point upstream of the gas loads being served by the bleed system. The control circuitry of the bleed system may adjust the relative amounts of higher pressure gas and lower pressure gas extracted based on a comparison between the monitored control variable and a system setpoint. In this manner, the bleed system may use the control variable as a proxy for system demand. However, in bleed systems serving multiple gas loads with individual mixed gas requirements, a single and/or unvarying system setpoint for the monitored control variable may be inadequate to accurately reflect the system demand as the individual gas loads are transiently operated (e.g., are turned on or off, or experience increased or decreased output load). This may result in extracting more higher pressure gas from the turbine engine than might be required based on the actual demands of the individual loads. This excess use of the higher pressure gas may detract from the achievable fuel efficiency of the turbine engine. That is, because the bleed air is generally extracted after compression by the turbine engine, bleed air use may result in additional fuel consumption by the turbine engine. Hence, the fuel efficiency of the turbine engine may be impacted by the bleed system.

The bleed system disclosed herein is configured to adjust an amount of the higher pressure gas and the lower pressure gas extracted by at least comparing a fluid parameter (e.g., a pressure, a temperature, and/or flow rate) within the bleed system to a system setpoint using control circuitry. The control circuitry is configured to receive a signal indicative of the fluid parameter and compare the indicated fluid parameter to a set point. The control circuitry may be configured to establish the system setpoint based on reception of a communication signal, such that the system setpoint may be varied. The control circuitry is configured to cause a jet pump system of the bleed system to alter a system mixing ratio of the higher pressure gas to the lower pressure gas based on a comparison of the fluid parameter indicated and the established system setpoint. In examples, the control circuitry is configured to establish the system setpoint based on individual gas loads operating within the bleed system at a given time. Hence, the bleed system may be configured to substantially maintain the fluid parameter based on a variable system setpoint, where the variable system setpoint is determined based on the individual gas loads currently operating in the bleed system. This may reduce an amount of higher pressure gas extracted from the compressor section and limit the impact of the extraction on turbine engine efficiency. This also reduces the temperature of the bleed air stream that must be cooled in heat exchanger(s), enabling reduced weight and size and increased reliability of the heat exchanger(s).

The bleed system disclosed herein is configured to receive a lower pressure gas and a higher pressure gas from a turbine engine. The lower pressure gas may be air, such as an IP air. The higher pressure gas may be air, such as HP air. The turbine engine may be configured to intake the gas (e.g., air) through an intake and compress the gas using one or more compressor stages. The turbine engine may be configured to provide some portion of the compressed gas as the lower pressure gas and the higher pressure gas. For example, the turbine engine may be configured to provide the lower pressure gas from a lower pressure stage in a compressor section of the turbine engine (e.g., the third compressor stage) and provide the higher pressure gas from a higher pressure stage in the compressor section of the turbine engine (e.g., the seventh compressor stage). In examples, the turbine engine is configured to provide another portion of the compressed gas to a combustion chamber for use as an oxidant to enable the combustion of a fuel.

The bleed system is configured to combine the lower pressure gas and the higher pressure gas received to produce a mixed gas. The bleed system is configured to provide the mixed gas to one or more gas loads configured to receive the mixed gas. For example, when the mixed gas is air, the bleed system may be configured to provide the mixed gas to an Environmental Control System (ECS) configured to cool and/or pressurize a cabin of an aircraft. As another example, in addition to or instead of the ECS, the bleed system may be configured to provide the mixed gas to one or more air driven motors such as an Air Drive Unit (ADU) configured to pressurize hydraulics, an aircraft wing anti-icing system configured to remove and/or limit ice on an aircraft wing, an inert gas generating system, and other gas loads. The bleed system may be configured to provide the mixed gas to any pneumatic system configured to receive a gas. The pneumatic system may be a system configured to support the operations of aircraft.

The bleed system includes a jet pump system configured to receive the lower pressure gas and higher pressure gas. The jet pump system is configured to mix the lower pressure gas and the higher pressure gas to produce a mixed gas. The jet pump system may be configured to supply the mixed gas to a gas supply header configured to provide the gas to gas loads served by the bleed system. In examples, the jet pump system is configured to vary a system mixing ratio of the higher pressure gas to the lower pressure gas when the jet pump produces the mixed gas.

The jet pump system is configured to produce the mixed gas using a plurality of jet pump assemblies. In examples, each jet pump assembly is configured to receive at least some portion of the higher pressure gas and at least some portion of the lower pressure gas. Each jet pump assembly may mix the higher pressure gas portion and the lower pressure gas portion received and each produce a discharge gas stream. The jet pump system may be configured to merge and/or mix each of the discharge gas streams to produce the mixed gas. The jet pump system may be configured to subsequently supply the mixed gas generated by the merging and/or mixing the discharge gas streams to the gas supply header of the bleed system. The jet pump system may be configured to merge and/or mix any number of discharge gas streams to produce the mixed gas. In examples, the jet pump system includes four or more jet pump assemblies and the jet pump system is configured to merge and/or mix four or more discharge gas streams (e.g., one from each jet pump assembly).

In examples, the jet pump system is configured with two or more (e.g., at least four) of the jet pump assemblies arranged in a substantially parallel flow arrangement, such that the jet pump system may provide an individual flow of the lower pressure gas and an individual flow of the higher pressure gas to each of jet pump assemblies. For example, the jet pump system may be configured to provide a first lower pressure gas portion and a first higher pressure gas portion to a first jet pump assembly, provide a second lower pressure gas portion and a second higher pressure gas portion to a second jet pump assembly, and so on for other jet pump assemblies within the jet pump system. The first lower pressure gas portion and the second lower pressure gas portion (and other lower gas portions provided) may be portions of the lower pressure gas received by the bleed system. The first higher pressure gas portion, the second higher pressure gas portion (and other higher has portions provided) may be portions of the higher pressure gas received by the bleed system. Each jet pump assembly in the jet pump system may mix its higher pressure gas portion received and its lower pressure gas portion received to produce an individual discharge gas stream. The jet pump system is configured to merge and/or mix the individual discharge gas streams to produce the mixed gas.

A jet pump assembly of the jet pump system may be configured to mix its respective higher pressure gas portion and lower pressure gas portion substantially in a mix proportion controlled by the jet pump assembly. The mix proportion may be indicative of a mass and/or volume of the higher pressure gas portion relative to a mass and/or volume of the lower pressure gas portion in the discharge gas stream produced by the jet pump assembly. The jet pump may alter its mix proportion to, for example, alter and/or control a property of its discharge gas stream (e.g., a temperature and/or pressure of its discharge gas stream). In examples, the jet pump assembly is configured to alter its mix proportion by altering a position of a translating member (e.g., a needle) within the jet pump assembly. For example, the jet pump assembly may be configured to produce a discharge gas stream substantially having a primary mix proportion when the translating member is in a first position and produce a discharge gas stream substantially having a secondary mix proportion when the translating member is in a second position. In examples, each jet pump assembly may alter its mix proportion substantially independently of other jet pump assemblies in the jet pump system. Hence, each jet pump assembly may provide an discharge gas stream exhibiting one or more properties which differ from other individual discharge gas streams provided by other jet pump assemblies within the jet pump system. Further, a primary mix proportion produced by a first jet pump may be substantially the same or may be substantially different from a primary mix proportion produced by a second jet pump assembly (or another jet pump assembly). A secondary mix proportion produced by a first jet pump may be substantially the same or may be substantially different from a secondary mix proportion produced by a second jet pump assembly (or another jet pump assembly).

The jet pump system (e.g., a controller) may be configured to control an individual mix proportion of an individual jet pump assembly to control a fluid property of an individual discharge gas stream provided by the individual jet pump assembly. The jet pump system may be configured to alter the individual mix proportion to alter a property of the mixed gas produced when the jet pump system mixes and/or merges the individual discharge gas stream with other discharge gas streams to produce the mixed gas. Likewise, the jet pump system may be configured to alter the mix proportions of other jet pump assemblies to alter a property of the mixed gas produced when the jet pump system mixes and/or merges the discharge gas streams to produce the mixed gas. Hence, the jet pump system may be configured to control and/or alter a property of the mixed gas provided to a supply header of the bleed system by altering a mix proportion of one or more jet pump assemblies of the jet pump system.

When the jet pump system mixes and/or merges the discharge gas streams of the jet pump assemblies to produce the mixed gas, the jet pump system may establish a system mixing ratio. The system mixing ratio may be indicative of a ratio of the higher pressure gas relative to the lower pressure gas within the mixed gas produced. In examples, the jet pump system is configured to control the system mixing ratio by controlling a mix proportion of one or more of the jet pump assemblies (e.g., by controlling a position of a jet pump assembly to control its resulting mix proportion). For example, the jet pump system may be configured to alter the system mixing ratio by causing one or more jet pump assemblies to alter its mix proportion, thereby altering a ratio of the higher pressure gas relative to the lower pressure gas within the mixed gas produced when the discharge gas streams of the jet pump assemblies are merged. The jet pump system may alter the system mixing ratio to, for examples, impact a property of the mixed gas provided to the supply header of the air bleed system.

In examples, a jet pump assembly is configured to define one or more of a series of discrete pump configurations to alter its mix proportion. For examples, the jet pump assembly may define at least an open position to produce a discharge gas stream substantially having a primary mix proportion and a control position to produce a discharge gas stream substantially having a secondary mix proportion. The jet pump system may alter the system mixing ratio by causing the jet pump assembly to establish one of the discrete pump configurations, such as the open position or the closed position. In examples, the jet pump system is configured to alter the system mixing ratio by causing each jet pump assembly to assume a discrete pump configuration (e.g., to assume either an open position or a control position). In examples, the jet pump system is configured to translate each jet pump assembly between the discrete pump configurations in order to alter the system mixing ratio. In examples, a jet pump assembly may assume at least an open position and a control position, but may further assume other discrete pump configurations besides the open position and the control position. Jet pump system 118 may be configured to cause a jet pump assembly to assume any discrete pump configuration to control a system mixing ratio.

For example, the jet pump system may establish a first system mixing ratio by placing a first jet pump assembly, a second jet pump assembly, and a third jet pump assembly in their control positions while placing a fourth jet pump assembly in its open position. The jet pump system may establish a second system mixing ratio by placing the first jet pump assembly and the second jet pump assembly in their control positions while placing the third jet pump assembly and the fourth jet pump assembly in their open positions. The jet pump system may establish a third system mixing ratio by placing the first jet pump assembly and the third jet pump assembly in their control positions while placing the second jet pump assembly and the fourth jet pump assembly in their open positions, and so on. Hence, the jet pump system may be configured to substantially establish a system mixing ratio by placing each jet pump assembly in a discrete pump configuration, and may be configured to alter the system mixing ratio by altering the discrete pump configuration of one or more jet pump assemblies. Altering the system mixing ratio by causing a jet pump assembly to transfer between discrete pump configurations (e.g., from an open position to a control position, or vice-versa) may simplify the architecture of the jet pump, resulting in, for example, cost and weight reduction, and may foster a reliability improvement through elimination of devices required for continuously variable modulation.

In examples, the jet pump system is configured to enable elimination of a jet pump bypass valve, which is typically required to reduce flow restrictions and/or pressure losses associated with operation at low engine throttle from the HP air source. The jet pump system may be configured to position one or more of the jet pump assemblies to sufficiently reduce flow restrictions and/or pressure losses as the higher pressure gas and/or lower pressure gas flows through the one or more jet pump assemblies during operation at low engine throttle. The jet pump system may be configured such that the reduced flow restrictions and/or pressure losses during operation at low engine throttle are comparable and/or similar to those flow restrictions and/or pressure losses of the jet pump bypass valve during operation at low engine throttle.

The control circuitry of the bleed system is configured to cause the jet pump system to alter the system mixing ratio based on a fluid parameter (e.g., a pressure, a temperature, and/or a flow rate) of the mixed gas in the bleed system. For example, in some examples, the control circuitry is configured to receive one or more signals (e.g., an electronic, optical, or other signal) indicative of the one or more fluid parameters from one or more sensors within the bleed system and cause the jet pump to alter the system mixing ratio based on the signals. As discussed, the jet pump system may alter the mix proportion of one or more jet pump assemblies to alter the system mixing ratio (e.g., by placing each jet pump assembly in a discrete pump configuration, such as an open position, a control position, or another discrete pump configuration). In examples, the control circuitry is configured to compare the fluid parameter indicated by the sensor with a system setpoint and cause the jet pump system to alter the system mixing ratio based on the comparison. The jet pump system may be configured to alter the system mixing ratio (e.g., increase or decrease the ratio of the higher pressure gas to the lower pressure gas in the mixed gas) in order to reduce and/or eliminate a departure between the indicated fluid parameter and the set point. Thus, the bleed system may be configured to configured to substantially maintain the fluid parameter based on a variable system setpoint, potentially limiting the impact of the higher pressure gas extraction on the efficiency of a turbine engine providing the higher pressure gas. The bleed system may limit the impact of one or more loads such as an ECS, an ADU, an anti-icing system, and/or a fuel pressurizing system of the fuel consumption of a turbine engine. In examples, the bleed system may reduce a size and/or weight requirement associated with a pre-cooler ("PCL") configured to cool a gas within the bleed system.

The control circuitry can determine the system setpoint using any suitable technique. In some examples, the control circuitry determines the system setpoint by at least referencing a system setpoint stored by a memory accessible to the control circuitry. In some examples, the control circuitry is configured to receive a load signal (e.g., one or more electronic communications) and establish the set point based on the load signal, such that the system setpoint may be varied and vary over time.

In some examples, the control circuitry is configured to determine the system setpoint based on a current and/or anticipated demand for the mixed gas based on an operating status of one or more of the gas loads within the bleed system. For example, the control circuitry may be configured to receive one or more load signals indicating the operating status of the one or more gas loads and establish the system setpoint based on the load signals. The load signal may be a binary on/off signal indicating whether a specific gas load is operating or secured, a signal indicative of an amount of mixed gas the specific gas load is using or anticipated to use, or some other signal type indicating use of the mixed gas by the specific gas load. Hence, the control circuitry may be configured to establish the system setpoint based on the mixed gas demand of the operating gas loads within the bleed system, such that the jet pump adjusts the amount of the higher pressure gas extracted based on the operational needs of the currently operating gas loads.

FIG. 1 illustrates an example bleed system 100 configured to receive a lower pressure gas and a higher pressure gas from a turbine engine 102 of an aircraft 104. While aircraft 104 is primarily referred to in the description of FIG. 1 and some of the other figures, bleed system 100 and other bleed systems described herein may be part of another vehicle or another non-vehicle system that includes gas loads configured to receive bleed air.

Turbine engine 102 includes a turbine engine fan section 106, a compressor section 108, a combustion section 110, and an exhaust section 112. Turbine engine 102 is configured to receive a gas flow (e.g., an air flow) via turbine engine fan section 106 and compress the gas in compressor section 108 using a series of compressor stages to progressively increase the gas pressure. Turbine engine 102 mixes a portion (e.g., a majority) of the compressed gas and a fuel in a combustion section 110 to cause a combustion and generate combustion gases. The combustion gases eject through an exhaust section 112 to generate engine thrust for aircraft 104. Aircraft 104 may include any number of engines such as turbine engine 102 configured to generate engine thrust on aircraft 104.

Bleed system 100 is configured to divert some amount of the compressed gas from compressor section 108 prior to the compressed gas entering combustion section 110. Bleed system 100 may be configured to extract the compressed gas from multiple compressor stages of compressor section 108 of turbine engine 102. For example, bleed system 100 may extract a lower pressure air from a lower pressure compressor stage of compressor section 108 through a conduit 114 fluidly coupled to the lower pressure compressor stage and extract a higher pressure air from a higher pressure compressor stage of compressor section 108 through a conduit 116 fluidly coupled to the higher pressure compressor stage. In some examples, the lower pressure gas is IP air from an intermediate compressor stage of turbine engine 102 and the higher pressure gas is HP air from a high compressor stage of turbine engine 102. In other examples, however, the lower pressure gas is air from a different compressor stage of turbine engine 102 and/or the higher pressure gas is air from a different compressor stage, but is still at a higher pressure than the lower pressure gas.

Bleed system 100 includes a jet pump system 118 is configured receive the lower pressure gas via conduit 114 and the higher pressure gas via conduit 116. Jet pump system 118 is configured to combine the higher pressure gas and the lower pressure gas to produce a mixed gas. Jet pump system 118 is configured to combine the lower pressure gas and the higher pressure gas in a system mixing ratio, where the system mixing ratio reflects a ratio of the higher pressure gas to the lower pressure gas combined when jet pump system 118 produces the mixed gas. Jet pump system 118 is further configured to alter the system mixing ratio. Jet pump system 118 includes a plurality of jet pump assemblies with each jet pump assembly configured to receive a higher pressure gas portion (e.g., a portion of the higher pressure gas delivered via conduit 116) and a lower pressure gas portion (e.g., a portion of the lower pressure gas delivered via conduit 114). Each jet pump assembly may mix its respective higher pressure gas portion and lower pressure gas portion to produce a discharge gas stream. Jet pump system 118 is configured to mix and/or merge the discharge gas streams produced to produce the mixed gas. Jet pump system 118 may alter a mix proportion of one or more of the jet pump assemblies to alter the system mixing ratio (e.g., to alter a ratio of the higher pressure gas to the lower pressure gas combined to produce the mixed gas). For example, jet pump system 118 may alter a system mixing ratio by causing one or more of the jet pump assemblies to assume a discrete pump configuration, such as an open position, a control position, or another discrete pump configuration.

In examples, a jet pump assembly within jet pump system 118 includes a translating member configured to translate to alter the mix proportion of the jet pump assembly. For example, a jet pump assembly may be a variable nozzle jet pump including a translating member (e.g., a needle) configured to translate relative to a nozzle body of the jet pump assembly to increase or decrease a flow area for the higher pressure gas or the lower pressure gas. Jet pump system 118 may be configured to cause the jet pump assembly to translate the translating member to increase or decrease the flow area in order to vary the mix proportion of the higher pressure gas to the lower pressure gas combined to produce the discharge gas stream for the jet pump assembly. In examples, jet pump system 118 causes the jet pump assembly to assume a discrete pump configuration (e.g., an open position, a control position, or another discrete pump configuration). The discrete pump configuration may be, for example, a defined position of the translating body relative to the nozzle body.

The use of a jet pump system such as jet pump system 118 configured to alter the system mixing ratio by altering a mix proportion for a plurality of jet pump assemblies may enable control of a fluid parameter (e.g., a pressure) within the bleed system over a greater range and/or in a more responsive manner than that which might be achieved using a fixed nozzle jet pump. For example, a fixed nozzle jet pump system may be more limited in the maximum or minimum values of the fluid parameter the fixed nozzle may achieve by mixing the higher pressure gas and the lower pressure gas as compared to a jet pump system 118. The fixed nozzle jet pump may further be reliant on other components within the bleed system to increase or decrease a flow rate of the higher pressure gas and/or lower pressure gas to alter the system mixing ratio, possibly resulting in a decreased responsiveness of the system.

Bleed system 100 includes control circuitry 122 configured to cause jet pump system 118 to alter the system mixing ratio. Control circuitry 122 is configured to receive a signal (e.g., an electrical signal or an optical signal) indicative of a fluid parameter of the mixed gas (e.g., a pressure, temperature, and/or flow rate) from a sensor 124 and compare the indicated fluid parameter to a system setpoint. Control circuitry 122 may be configured to receive the signal via a communication link 123. Control circuitry 122 is configured to cause jet pump system 118 to alter the system mixing ratio based on the comparison of the indicated fluid parameter indicated and the system setpoint. For example, if the fluid parameter indicated by sensor 124 is less than a system setpoint, then control circuitry 122 may cause jet pump system 118 to alter the system mixing ratio such that the fluid parameter within supply conduit 120 increases to substantially match (e.g., match or get closer to, such as within 1%-10% of) the system setpoint. If the fluid parameter indicated by sensor 124 is greater than a system setpoint, then control circuitry 122 may cause jet pump system 118 to alter the system mixing ratio such that the fluid parameter within supply conduit 120 decreases to substantially match the system setpoint. In examples, the system setpoint is defined by a range of values around a central setpoint value, and the fluid parameter within supply conduit 120 substantially matches the system setpoint when the fluid parameter is within the range of values. In examples, control circuitry 122 is configured to transmit a control signal to cause jet pump system 118 to alter the system mixing ratio via a communication link 125.

In some examples, bleed system 100 includes a pre-cooler 126 ("PCL 126") configured to exchange heat with (e.g., cool) the mixed gas issued from jet pump system 118 to supply conduit 120. For example PCL 126 may be configured to cool the mixed gas from a temperature greater than about 400° F. (204° C.) to temperature less than about 380° F. (193° C.). PCL 126 may be configured to receive a gas flow via conduit 128 and may be configured to cause heat exchange between the gas flow and the mixed gas in PCL 126. In examples, conduit 128 is fluidly coupled to turbine engine fan section 106 of turbine engine 102, and bleed system 100 is configured to supply the gas flow to PCL 126 from the turbine engine fan section 106. The gas flow received via conduit 128 may be relatively low pressure air ("fan air") from turbine engine fan section 106. PCL 126 may be configured to discharge the gas flow via discharge conduit 130 following the heat exchange with the mixed gas. In examples, bleed system 100 is configured to discharge the gas flow overboard or into the engine core compartment of aircraft 104 via discharge conduit 130.

Bleed system 100 may include a filtration unit 132 configured to condition at least some portion of the mixed gas. In examples, filtration unit 132 is configured to reduce an ozone concentration within the mixed gas by, for example, converting some portion of the ozone (O3) in the mixed gas to diatomic oxygen (O2). Filtration unit 132 may be configured to remove substances such as hydrocarbons, water, and/or particulates from the mixed gas. Although illustrated in FIG. 1 located downstream of jet pump system 118 and PCL 126, filtration unit 132, if present, may be located in any suitable place within bleed system 100. For example, filtration unit 132 may be located downstream of jet pump system 118 and upstream of PCL 126 (e.g., between jet pump system 118 and PCL 126), or elsewhere within bleed system 100.

Bleed system 100 is configured to distribute the mixed gas from supply conduit 120 to one or more gas loads 134 of aircraft 104, such as environmental control system 136 ("ECS 136"), tank system 138, air drive unit 140 ("ADU 140"), and/or anti-icing system 142. ECS 136 may be configured to further condition a first portion of the mixed gas prior to utilizing the first portion to pressurize a cabin of aircraft 104. Tank system 138 may be configured to utilize a second portion of the mixed gas (e.g., a nitrogen-enriched portion) to pressurize a tank of tank system 138. Bleed system 100 may include an inert gas generation system 144 configured to reduce an oxygen concentration of the second portion prior to the second portion entering a tank within tank system 138. ADU 140 may be a gas-driven motor configured to utilize a third portion of the mixed gas to pressurize a hydraulic system of aircraft 104 to allow, for example, the operation of flaps and other control surfaces of aircraft 104. Anti-icing system 142 may be configured to utilize a fourth portion of the mixed gas to remove and/or limit ice on a wing or other portion of aircraft 104. Bleed system 100 may be configured to provide the mixed gas to a pneumatic system 141 of aircraft 104 instead of or in addition to ECS 136, tank system 138, ADU 140, or anti-icing system 142. Pneumatic system 141 may be a system, device, component, or combination thereof configured to receive mixed gas from a gas source such as bleed system 100. In examples, pneumatic system 141 is a system, device, component, or combination thereof configured to support the operations of aircraft 104.

As discussed, control circuitry 122 is configured to receive a signal indicative of a fluid parameter of the mixed gas from sensor 124. The signal may be an electronic signal, an optical signal, or another signal sufficient to provide information describing the fluid parameter from sensor 124 to control circuitry 122. Sensor 124 is configured to monitor the fluid parameter of the mixed gas within supply conduit 120. Jet pump system 118 is configured to produce the mixed gas by at least combining the higher pressure gas received via conduit 116 and the lower pressure gas received via conduit 114. Control circuitry 122 is configured to cause jet pump system 118 to alter a system mixing ratio of the higher pressure gas to the low pressure gas used to produce the mixed gas based on the signal received from sensor 124. In examples, control circuitry 122 compares the fluid parameter indicated by the signal from sensor 124 to a system setpoint, and causes jet pump system 118 to alter the system mixing ratio based on the comparison.

The demand for the mixed gas by gas loads 134 may impact the fluid parameter of the mixed gas within supply conduit 120. For example, when the fluid parameter is a pressure and sensor 124 is configured to indicate a pressure of the mixed gas in supply conduit 120, an increased demand for the mixed gas (e.g., an increased mass flow) to ECS 136, tank system 138, ADU 140, anti-icing system 142, and/or another gas load served by bleed system 100 may cause a decrease in the pressure of the mixed gas in supply conduit 120. The decrease in pressure may cause sensor 124 to provide a signal to control circuitry 122 indicative of the reduced pressure. In response to the signal, control circuitry 122 may cause jet pump system 118 to alter the system mixing ratio of the higher pressure gas to the lower pressure gas to cause the pressure of the mixed gas in supply conduit 120 to increase. For example, control circuitry 122 may cause jet pump system 118 to alter a discrete pump configuration of one or more jet assemblies to increase a flow of the higher pressure gas received via conduit 116.

Similarly, a decreased demand for the mixed gas to ECS 136, tank system 138, ADU 140, anti-icing system 142, and/or another gas load served by bleed system 100 may cause an increase in the pressure of the mixed gas in supply conduit 120, causing sensor 124 to provide a signal indicative of the increased pressure, such that control circuitry 122 causes jet pump system 118 to alter the system mixing ratio to cause the pressure of the mixed gas in supply conduit 120 to decrease. Control circuitry 122 may compare the fluid parameter indicated by the signal from sensor 124 to a system setpoint, such that control circuitry 122 causes jet pump system 118 to alter the system mixing ratio until jet pump system 118 achieves a system mixing ratio causing the fluid parameter indicated to better match (e.g., substantially match) the system setpoint.

In examples, bleed system 100 and/or gas loads 134 may be configured such that the individual demand for mixed gas from an individual gas load is satisfied by a value of the fluid parameter within supply conduit 120 different from a value of the fluid parameter required by one or more other gas loads within gas loads 134. For example, bleed system 100 and/or gas loads 134 may be configured such that the demand for mixed gas from a first gas load (e.g., ECS 136) is satisfied by a first value of the fluid parameter of the mixed gas within supply conduit 120 (e.g., satisfied by a first pressure). Bleed system 100 and/or gas loads 134 may be configured such that the demand for mixed gas from a second gas load (e.g., tank system 138) is satisfied by a second value of the fluid parameter within supply conduit 120 (e.g., satisfied by a second pressure). The first value may be different from the second value. Similarly, a third gas load (e.g., ADU 140) may require a third value different from the first value and/or the second value, and a fourth gas load (e.g., anti-icing system 142) may require a fourth value different from the first value, the second value, and/or the third value. Similarly, different operating combinations among the first gas load, the second gas load, the third gas load, and/or the fourth gas load may require differing values of the fluid parameter within supply conduit 120 to satisfy the combined gas demand of the operating gas loads. Hence, providing a mixed gas based on a single, unvarying system setpoint may result in extracting more higher pressure gas from turbine engine 102 than might actually be required based on the combined gas demand of the operating gas loads. This excess use of the higher pressure gas may reduce the fuel efficiency (e.g., may increase the thrust-specific fuel consumption (TFSC)) achieved during operation of turbine engine 102.

Control circuitry 122 is configured to determine the system setpoint for bleed system 100 using any suitable technique. In some example, the system setpoint is determined by other control circuitry and transmitted to control circuitry 122. In addition or instead, in some examples, control circuitry 122 is configured to establish the system setpoint for bleed system 100. For example, control circuitry 122 may be configured to establish the system setpoint based on an operating status of one or more of gas loads 134. In examples, control circuitry 122 is configured to receive a load signal indicative of an operating status of the one or more of gas loads 134 and determine the system setpoint based on the load signal. The load signal may be, for example, a binary on/off signal indicating whether a gas load within gas loads 134 is operating or secured, a signal indicative of an amount of mixed gas the gas load within gas loads 134 is using or anticipated to use, or some other signal type indicating use of the mixed gas by the gas load within gas loads 134. In examples, control circuitry 122 is configured to receive a plurality of load signals from a plurality of gas loads within gas loads 134 and establish the system setpoint based on the plurality. For example, control circuitry 122 may be configured to receive a first signal from a first gas load (e.g., ECS 136), a second signal from a second gas load (e.g., tank system 138), a third signal from a third gas load (e.g., ADU 140), and/or a fourth signal from a fourth gas load (e.g., anti-icing system 142). Control circuitry 122 may be configured to ascertain a combination of gas loads currently operating within bleed system 100 based the first signal, the second signal, the third signal, and/or the fourth signal. Control circuitry 122 may be configured to establish the system setpoint based on the ascertained combination. Jet pump system 118 may alter a system mixing ratio of the higher pressure gas to the lower pressure gas to meet the system setpoint established by control circuitry 122, such that jet pump system 118 extracts an amount of higher pressure gas from turbine engine 102 based on the combined gas demand of the ascertained combination of gas loads.

Figure 2:
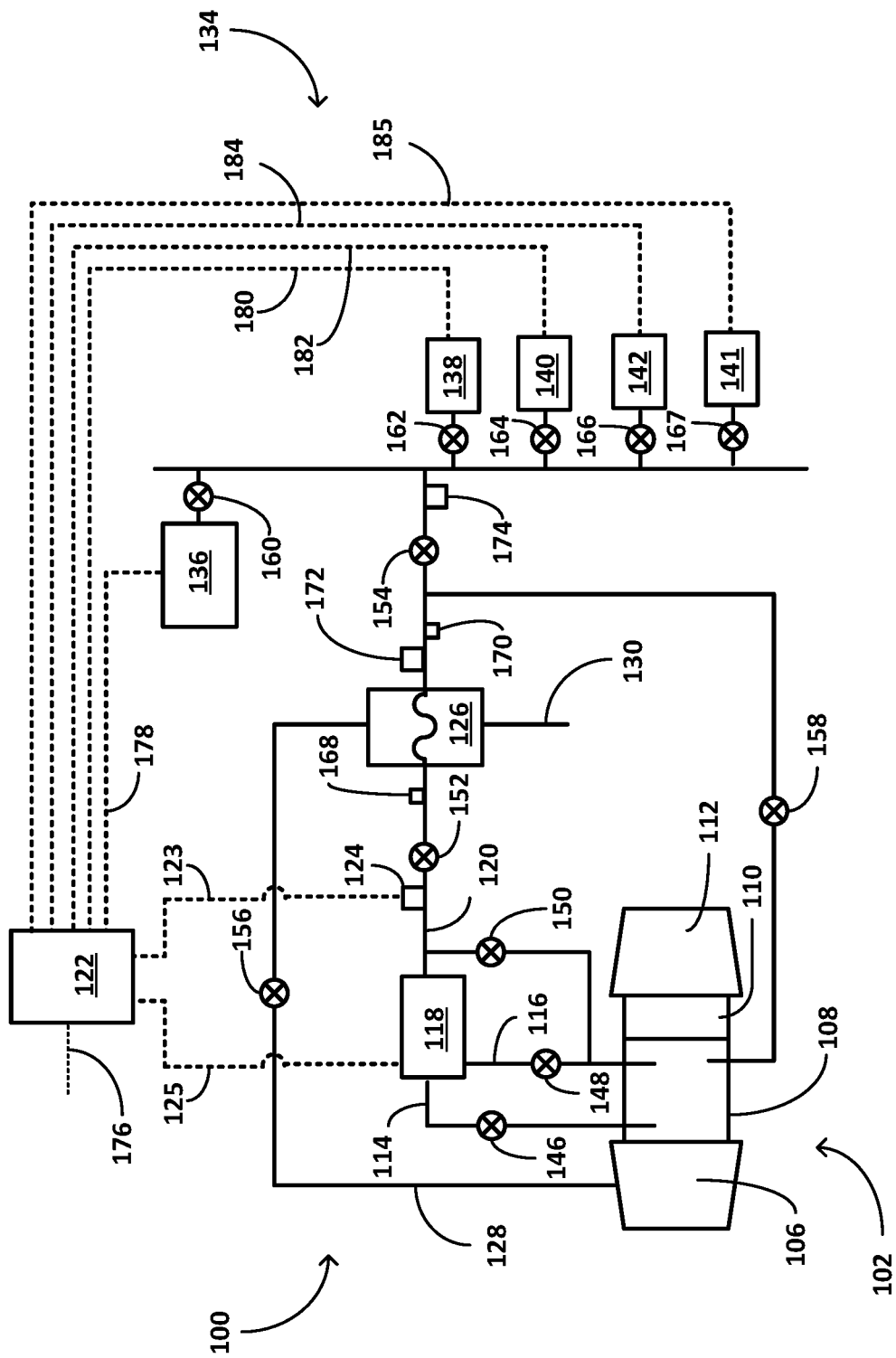
FIG. 2 is a schematic illustration of an example bleed system serving gas loads.

FIG. 2 illustrates an example bleed system 100 including jet pump system 118 and one or more gas loads 134. Jet pump system 118 is configured to extract a lower pressure gas via conduit 114 and a higher pressure gas via conduit 116 from turbine engine 102. Jet pump system 118 is configured to provide a mixed gas to supply conduit 120 for used by one or more gas loads 134, such as ECS 136, tank system 138, ADU 140, anti-icing system 142, and/or pneumatic system 141. Control circuitry 122 is configured to receive a signal indicative of a fluid parameter of the mixed gas from sensor 124 and cause jet pump system 118 to vary a system mixing ratio of the higher pressure gas to the lower pressure gas extracted based on the signal.

Bleed system 100 may be configured for use on an aircraft, such as aircraft 104 (FIG. 1). Bleed system 100 may include additional valves, sensors, and other equipment at various locations within bleed system 100. For example, bleed system 100 may include one or more of an intermediate pressure check valve 146 ("IPCV") configured to allow a flow of lower pressure gas through conduit 114, a high pressure valve 148 ("HPV") configured to allow a flow of higher pressure gas through conduit 116, a jet pump system bypass valve 150 ("JPBPV") configured to bypass a portion of the higher pressure gas around jet pump system 118, a mid-pressure valve 152 ("MPV") and/or over pressure shut off valve 154 ("OPSOV") configured to allow a flow of mixed gas in supply conduit 120, a fan air valve 156 ("FAV") configured to allow a flow of gas (e.g., air) from turbine engine fan section 106 via conduit 128 to PCL 126, starter valve 158 configured to allow a flow of mixed gas to turbine engine 102, flow control valve 160 ("FCV") configured to control a flow of the mixed gas to ECS 136, and valve 162, valve 164, valve 166, and valve 167 configured to control a flow of mixed gas to tank system 138, ADU 140, anti-icing system 142, and pneumatic system 141 respectively.

Bleed system 100 may include one or more of bleed temperature sensor 168 ("TB") and/or manifold temperature sensor 170 ("TM") configured to sense a temperature of the mixed gas in supply conduit 120, and first manifold pressure sensor 172 ("PM1") and/or second manifold pressure sensor 174 ("PM2") configured to sense a pressure of the mixed gas in supply conduit 120. Bleed system 100 may include other valves, sensors, and/or control equipment configured to control a flow of gas through bleed system 100.

In some examples, control circuitry 122 is configured to compare the signal received from sensor 124 to a system setpoint and cause jet pump system 118 to alter the system mixing ratio of the higher pressure gas received via conduit 114 to the lower pressure gas received via conduit 116 based on the comparison. In examples, control circuitry 122 is configured to receive the system setpoint by at least referencing a system setpoint stored by a memory accessible to the control circuitry. Control circuitry 122 may receive the system setpoint via, for example, communication link 176. The system setpoint received by control circuitry 122 may be variable. For example, control circuitry 122 may receive a first setpoint via communication link 176 and cause jet pump system 118 to alter the system mixing ratio such that the fluid parameter sensed by sensor 124 substantially matches and/or satisfies the system setpoint. Control circuitry 122 may subsequently receive a second setpoint different from the first setpoint via communication link 176 and cause jet pump system 118 to alter the system mixing ratio such that the fluid parameter sensed by sensor 124 substantially matches and/or satisfies the second setpoint. Hence, control circuitry 122 may be configured to cause jet pump system 118 to adjust the higher pressure gas and lower pressure gas extracted to substantially match a variable system setpoint. The ability of control circuitry 122 to cause jet pump system 118 to respond to a variable setpoint may reduce the amount of higher pressure gas extracted and limit impacts on turbine engine efficiency as compared to bleed systems configured to operate with a substantially constant and invariable system setpoint.

In some examples, control circuitry 122 may be configured to establish the system setpoint based on one or more load signals indicative of an operating status and/or anticipated gas demand of one or more gas loads 134 within bleed system 100. For example, ECS 136 may be configured to utilize a portion of the mixed gas generated by jet pump system 118 as a coolant for one or more air packs supplying air to an aircraft cabin. Control circuitry 122 may be configured to receive a first load signal indicative of (e.g., which changes as a function of) the quantity of the air packs operating or anticipated to operate within ECS 136 via communication link 178. Tank system 138 may be configured to utilize a portion of the mixed gas generated by jet pump system 118 to pressurize a tank as aircraft 104 operates. Control circuitry 122 may be configured to receive a second load signal indicative of a demand for tank pressurization by tank system 138 via communication link 180.

ADU 140 may be configured to utilize a portion of the mixed gas generated by jet pump system 118 to drive a gas driven motor configured to pressurize a hydraulic system for operation of control surfaces and/or landing gear of aircraft 104. Control circuitry 122 may be configured to receive a third load signal indicative of a demand by the gas driven motor to substantially maintain the hydraulic system pressure as control surfaces are operated via communication link 182. Anti-icing system 142 may be configured to utilize a portion of the mixed gas generated by jet pump system 118 to remove ice or other substances from a wing or other portion of aircraft 104. Control circuitry 122 may be configured to receive a fourth load signal indicative of a demand for anti-icing by anti-icing system 142 via communication link 184. In examples, control circuitry 122 may be configured to receive one or more additional load signals indicative of a demand for mixed gas by pneumatic system 141 via communication link 185. Control circuitry 122 may establish the system setpoint for bleed system 100 based on the load signals received, in order to minimize and/or eliminate an extraction of higher pressure air from turbine engine 102 in excess of that required for satisfactory operation of the gas loads 134.

A gas load (e.g., one or more of the gas loads 134) may be configured to generate the load signal based on the demand and/or anticipated demand for the mixed gas by the gas load. The gas load may be configured to transmit the load signal to control circuitry 122. In examples, some portion of or substantially all of control circuitry 122 may be housed and/or mechanically supported within a controller housing configured to be located adjacent to jet pump system 118 or another portion of bleed system 100. In some examples, control circuitry 122 is housed and/or mechanically supported by housings of one or more of gas loads 134 and/or one or more other housings within aircraft 104.

Control circuitry 122 may be configured to interpret any load signals (e.g., load signals received via communication links 178, 180, 182, 184) representing a demand for mixed gas from one or more of gas loads 134. For example, control circuitry 122 may be configured to interpret a load signal indicating demand by indicating whether a gas load is in an operating state consuming and/or anticipated to consume mixed gas or in a secured state wherein a mixed gas demand from the load is substantially negligible and/or absent. Control circuitry 122 may be configured to interpret a load signal indicating demand by indicating a specific and/or anticipated operating configuration of a gas load, such as a number of subsystems (e.g., air packs within ECS 136) operating/and/or anticipated to operate in the gas load. Control circuitry 122 may be configured to receive a load signal from one or more subsystems within an air load configured to operate when the gas load consumes the mixed gas. In examples, control circuitry 122 is configured to interpret load signals indicating a quantity of mixed gas consumed by an air load. For example, a portion of bleed system 100 such as a portion including flow control valve 160, valve 162, valve 164, or valve 166 may be configured to sense a mass flow or other parameter of mixed gas flowing through the bleed system portion and provide a load signal to control circuitry 122 based on the mass flow or other parameter. In examples, one or more gas loads 134 is configured to sense a mass flow or other parameter of mixed gas an provide the load signal to control circuitry 122 based on the mass flow or other parameter.

Sensor 124 may be configured to sense the fluid parameter of the mixed gas at any suitable location within bleed system 100. In some examples, sensor 124 is configured to sense the fluid parameter at a location within bleed system 100 downstream of jet pump system 118 and upstream of the one or more gas loads 134. For example, sensor 124 may be configured to sense the fluid parameter downstream of jet pump system 118 and upstream of PCL 126. Here, "downstream" connotes a flow direction of a mixed gas from jet pump system 118 and to the one or more gas loads 134 and/or PCL 126. "Upstream" connotes a flow direction opposite the downstream direction. Sensor 124 may be located upstream or downstream of other sensors and or components within bleed system 100, such as intermediate pressure check valve 146, high pressure valve 148, jet pump system bypass valve 150, mid-pressure valve 152, over pressure shutoff valve 154, fan air valve 156, flow control valve 160, valve 162, valve 164, valve 166, starter valve 158, bleed temperature sensor 168, manifold temperature sensor 170, first manifold pressure sensor 172, and/or second manifold pressure sensor 174.

In some examples, control circuitry 122 is configured to receive signals indicative of a fluid parameter from additional sensors within bleed system 100 in addition to sensor 124. For example, control circuitry 122 may be configured to receive one or more signals indicative of a fluid parameter from bleed temperature sensor 168, first manifold pressure sensor 172, manifold temperature sensor 170, second manifold pressure sensor 174, and other sensors configured to sense a fluid parameter of the mixed gas within bleed system 100. The additional sensors may be configured to sense the same type of fluid parameter as sensor 124, or may be configured to sense a type of fluid parameter different from that sensed by sensor 124. For example, control circuitry 122 may be configured to receive a first signal from sensor 124 indicative of a pressure of the mixed gas and receive one or more additional signals indicative of a temperature, flow rate, or other fluid parameter of the mixed gas. In these examples, control circuitry 122 is configured to cause jet pump system 118 to alter a system mixing ratio of the higher pressure gas received via conduit 116 and the lower pressure gas received via conduit 114 based on the first signal and the one or more additional signals.

Turbine engine 102 may be configured to receive a gas (e.g., air) from turbine engine fan section 106 and progressively increase the pressure of the gas through a series of successive compressor stages. Turbine engine 102 may be configured such that a first compressor stage compresses the gas to a first pressure, a second compressor stage receives the gas from the first compressor stage and increases the pressure to a second pressure greater than the first pressure, a third compressor stage receives the gas from the second compressor stage and increases the pressure to a third pressure greater than the second pressure, and so on until turbine engine 102 issues the gas from a final compressor stage to combustion section 110. In some examples, bleed system 100 is configured to extract higher pressure gas via conduit 116 from a compressor stage outside of the last 20% of the compressor stages of turbine engine 102. For example, turbine engine 102 may include a plurality of compressor stages designated one through ten, with the tenth compressor stage configured to issue compressed gas to combustion section 110, such that the 20% of the compressor stages includes compressor stage nine and compressor stage ten.

In some examples, turbine engine 102 is configured to increase a pressure of a gas stream as the gas stream flows from an initial compressor stage to a penultimate compressor stage to a final compressor stage, wherein the penultimate compressor stage is configured to issue the compressed gas to the final compressor stage and the final compressor stage is configured to issue the compressed gas to combustion section 110. Bleed system 100 may be configured to provide the higher pressure gas via conduit 116 from the gas stream prior to the gas stream flowing to one of the penultimate compressor stage or the final compressor stage.

In some examples, control circuitry 122 is configured to adjust the system setpoint based on operating loads such that bleed system 100 may extract the higher pressure gas (e.g., via conduit 116) from a compressor stage outside of the last 20% of the compressor stages of turbine engine 102, such as from a seventh or eighth compressor stage, and/or such that bleed system 100 may extract the higher pressure gas from a gas stream prior to the prior to the gas stream flowing to a penultimate or final compressor stage. Extracting the higher pressure gas prior to the final compressor stages of turbine engine 102 helps avoids an expenditure of compression energy on the higher pressure gas over the final compressor stages of turbine engine 102, potentially increasing a fuel efficiency (e.g., decreasing a thrust-specific fuel consumption (TFSC)) achieved during operation of turbine engine 102.

Bleed system 100 can include any suitable jet pump that is configured to be controlled by control circuitry 122 to adjust a ratio of a lower pressure gas and a higher pressure gas mixed by the jet pump. The jet pump can include a variable nozzle or other variable geometry the enables variable mixing of bleed air to meet the minimum pressure and flow requirements for gas loads 134 served by bleed system 100.

In examples, jet pump system 118 can be sized and controlled such that jet pump system bypass valve 150 can be eliminated. Jet pump system 118 may be configured to position such that the flow restriction and pressure drop of the HP air flow path is reduced adequately such that jet pump system bypass valve 150 can be eliminated.

Figure 3:
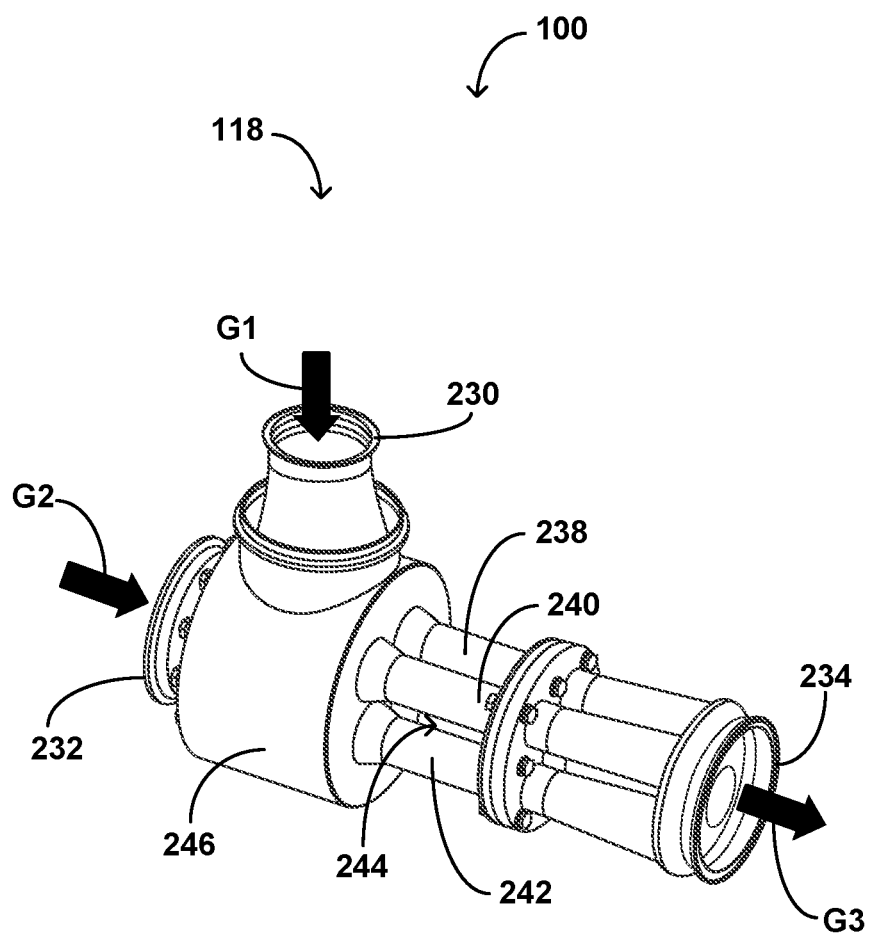
FIG. 3 is a perspective view of an example jet pump system including a plurality of jet pump assemblies.

FIG. 3 is a perspective illustration of an example jet pump system 118. Jet pump system 118 may include an HP bleed inlet 230 configured to receive a first gas flow G1 (e.g., a higher pressure air via conduit 116). Jet pump system 118 may include an IP bleed inlet 232 configured to receive a second gas flow G2 (e.g., a lower pressure air via conduit 114). Jet pump system 118 is configured to mix the first gas flow received via HP bleed inlet 230 and the second gas flow received via IP bleed inlet 232 to generate a mixed gas. Jet pump system 118 may include a mixed outlet 234 configured to discharge the mixed gas (e.g., to supply conduit 120) as mixed gas flow G3. Jet pump system 118 includes a plurality of jet pump assemblies 236 ("jet pump assemblies 236") configured to mix the first gas flow and the second gas flow. For examples, jet pump system 118 may include two or more of a first jet pump assembly 238, a second jet pump assembly 240, a third jet pump assembly 242, and a fourth jet pump assembly 244. In examples, jet pump system 118 includes an assembly body 246 supporting and/or defining at least one or more of HP bleed inlet 230, IP bleed inlet 232, mixed outlet 234, first jet pump assembly 238, second jet pump assembly 240, third jet pump assembly 242, and/or fourth jet pump assembly 244.

Figure 4:
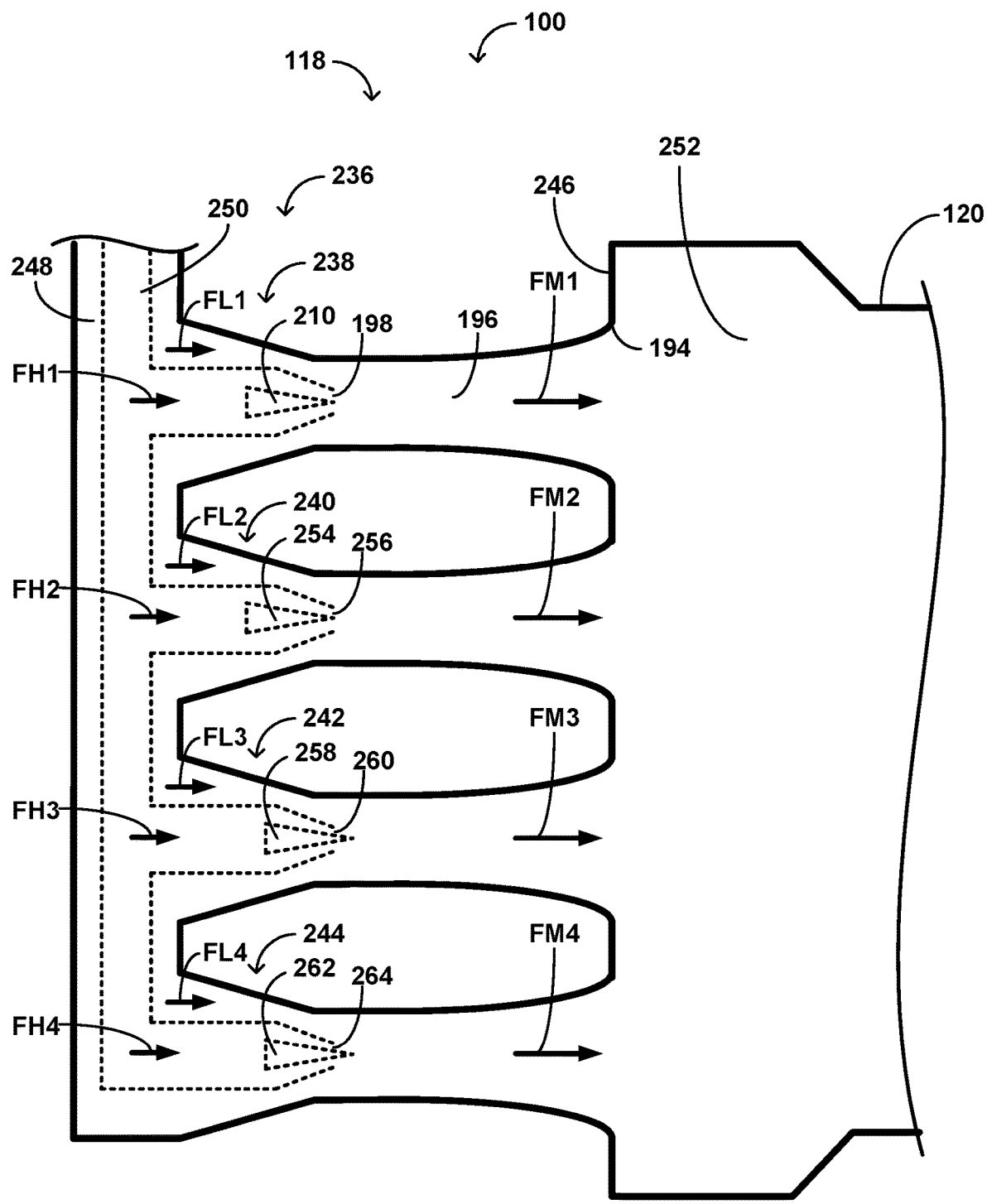
FIG. 4 is a schematic illustration of an example jet pump system including a plurality of jet pump assemblies.

FIG. 4 is a schematic illustration of jet pump system 118 including jet pump assemblies 236. Jet pump assemblies 236 may include first jet pump assembly 238, second jet pump assembly 240, third jet pump assembly 242, and fourth jet pump assembly 244. Jet pump system 118 is configured to receive the first gas flow G1 via HP bleed inlet 230 and substantially distribute first gas flow G1 among first jet pump assembly 238, second jet pump assembly 240, third jet pump assembly 242, and fourth jet pump assembly 244. Jet pump system 118 is configured to receive the second gas flow G2 via IP bleed inlet 232 and substantially distribute the second gas flow G2 among first jet pump assembly 238, second jet pump assembly 240, third jet pump assembly 242, and fourth jet pump assembly 244. For example, jet pump system 118 be configured to distribute first gas flow G1 (e.g., a higher pressure air) such that first jet pump assembly 238 receives a flow FH1, second jet pump assembly 240 receives a flow FH2, third jet pump assembly 242 receives a flow FH3, and/or fourth jet pump assembly 244 receives a flow FH4. Jet pump system 118 may be configured to distribute second gas flow G2 (e.g., a lower pressure air) such that first jet pump assembly 238 receives a flow FL1, second jet pump assembly 240 receives a flow FL2, third jet pump assembly 242 receives a flow FL3, and/or fourth jet pump assembly 244 receives a flow FL4. In examples, jet pump system 118 (e.g., assembly body 246) defines an HP passage 248 configured to distribute first gas flow G1. Jet pump system 118 (e.g., assembly body 246) may define an IP passage 250 configured to distribute second gas flow G2.

Each of jet pump assemblies 236 may be configured to mix a portion of first gas flow G1 and a portion of second gas flow G2 to generate a discharge gas stream comprising the portion of first gas flow G1 and the portion of second gas flow G2. For example, first jet pump assembly 238 may be configured to mix flow FH1 and flow FL1 to produce discharge gas stream FM1. Second jet pump assembly 240 may be configured to mix flow FH2 and flow FL2 to produce discharge gas stream FM2. Third jet pump assembly 242 may be configured to mix flow FH3 and flow FL3 to produce discharge gas stream FM3. Fourth jet pump assembly 244 may be configured to mix flow FH4 and flow FL4 to produce discharge gas stream FM4. In examples, each of jet pump assemblies 236 is configured to issue a discharge gas stream from a pump assembly outlet, such as pump outlet 194 of first jet pump assembly 238

Jet pump system 118 is configured to mix and/or merge discharge gas stream FM1, discharge gas stream FM2, discharge gas stream FM3, and/or discharge gas stream FM4 to provide a mixed gas. In examples, jet pump system 118 (e.g., assembly body 246) defines a mixing chamber 252 configured to receive discharge gas stream FM1, discharge gas stream FM2, discharge gas stream FM3, and/or discharge gas stream FM4. Mixing chamber 252 may be configured to mix and/or merge discharge gas stream FM1, discharge gas stream FM2, discharge gas stream FM3, and/or discharge gas stream FM4 such that jet pump system 118 produces mixed gas. Jet pump system 118 may be configured to provide the mixed gas to supply conduit 120. For example, mixing chamber 252 may be configured to fluidically communicate with supply conduit 120 such that jet pump system 118 may provide the mixed gas to supply As discussed, a jet pump assembly (e.g., first jet pump assembly 238, second jet pump assembly 240, third jet pump assembly 242, and/or fourth jet pump assembly 244) may be configured to mix its respective higher pressure gas portion (e.g., FH1, FH2, FH3, or FH4) and lower pressure gas portion (e.g., FL1, FL2, FL3, or FL4) substantially in a mix proportion controlled by the jet pump assembly. The mix proportion may be indicative of a mass and/or volume of the higher pressure gas portion relative to a mass and/or volume of the lower pressure gas portion used to produce a discharge gas stream (e.g., FM1, FM2, FM3, or FM4). A jet pump may alter its mix proportion to, for example, alter and/or control a property of its discharge gas stream (e.g., FM1, FM2, FM3, or FM4). In examples, a jet pump (e.g., first jet pump assembly 238, second jet pump assembly 240, third jet pump assembly 242, and/or fourth jet pump assembly 244) is configured to alter its mix proportion by altering a position of a translating member within the jet pump assembly.

For example, first jet pump assembly 238 is configured to issue gas flow FH1 into diffuser 196 via a flow area 198 defined by first jet pump assembly 238. First jet pump assembly 238 includes a translating member 210 configured to translate within first jet pump assembly 238 to vary flow area 198 (e.g., cause an increase or decrease in the area defined by flow area 198). By using translating member 210 to alter flow area 198, first jet pump assembly 238 may alter flow FH1 relative to flow FL1, and thereby alter the mix proportion of first jet pump assembly. Second jet pump assembly 240, third jet pump assembly 242, and/or fourth jet pump assembly 244 may be configured similarly to first jet pump assembly 238. For example, second jet pump assembly 240 may include translating member 254 configured to vary a flow area 256 of second jet pump assembly 240, third jet pump assembly 242 may include translating member 258 configured to vary a flow area 260 of third jet pump assembly 242, and/or fourth jet pump assembly 244 may include translating member 262 configured to vary a flow area 264 of fourth jet pump assembly 244.

In examples, each of jet pump assemblies 236 may alter its mix proportion substantially independently of other jet pump assemblies in jet pump assemblies 236, such that each of first jet pump assembly 238, second jet pump assembly 240, third jet pump assembly 242, and/or fourth jet pump assembly 244 may provide an discharge gas stream FM1, FM2, FM3, or FM4 exhibiting one or more properties which differ from any other of first jet pump assembly 238, second jet pump assembly 240, third jet pump assembly 242, and/or fourth jet pump assembly 244. The jet pump system 118 (e.g., a control circuitry 122) may be configured to control an individual mix proportion of an individual jet pump assembly to control a fluid property of an individual discharge gas stream provided by the individual jet pump assembly. Jet pump system 118 (e.g., control circuitry 122) may be configured to alter the mix proportions of first jet pump assembly 238, second jet pump assembly 240, third jet pump assembly 242, and/or fourth jet pump assembly 244 to control and/or alter a property of the mixed gas produced by jet pump system 118 (e.g., produced within mixing chamber 252).

Jet pump system 118 may establish a system mixing ratio indicative of a ratio of first gas flow G1 received via HP bleed inlet 230 relative to second gas flow G2 received via IP bleed inlet 232 to produce the mixed gas in mixing chamber 252. In examples, jet pump system 118 is configured to control the system mixing ratio by controlling a mix proportion of one or more of the jet pump assemblies 236 (e.g., by controlling a position of a translating member jet pump assembly to control its resulting mix proportion). For example, jet pump system 118 may be configured to alter the system mixing ratio by causing one or more of jet pump assemblies 236 to alter its mix proportion, thereby altering a ratio of first gas flow G1 relative to second gas flow G2 within the mixed gas produced within mixing chamber 252. Control circuitry 122 may cause jet pump system 118 to alter the system mixing ratio to, for examples, impact a property of the mixed gas provided to supply conduit 120 of bleed system 100.

Figure 5A:
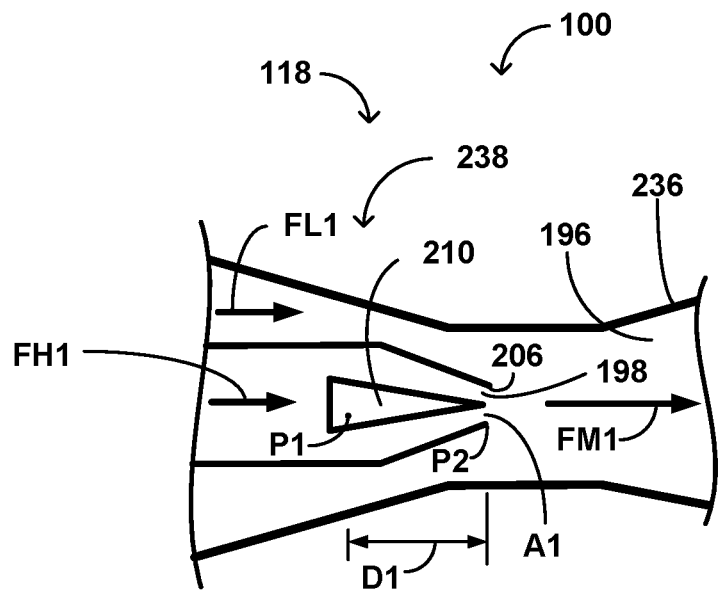
FIG. 5A is a schematic illustration of a jet pump assembly in a first discrete pump configuration.
Figure 5B:
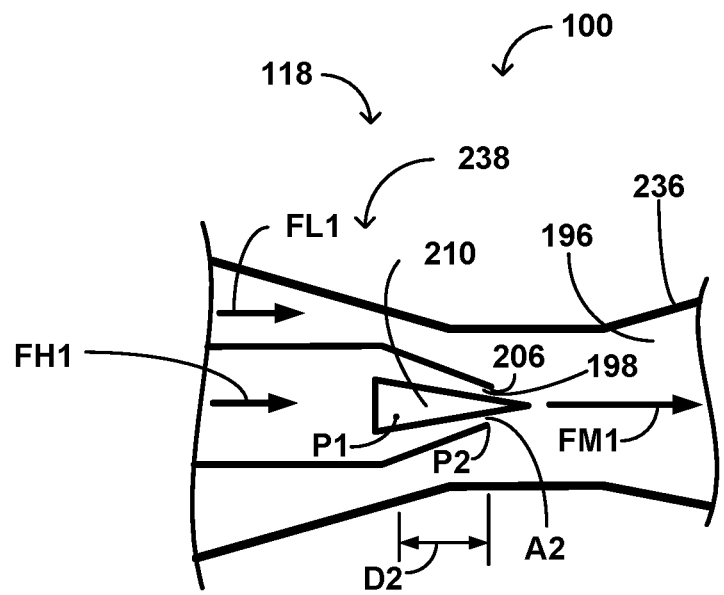
FIG. 5B is a schematic illustration of the jet pump assembly of FIG. 5A in a second discrete pump configuration.

In examples, a jet pump assembly is configured to define one or more of a series of discrete pump configurations to alter its mix proportion. For example, FIG. 5A schematically illustrates a portion of first jet pump assembly 238 in a first discrete pump configuration (e.g., an open position). For example, FIG. 5B schematically illustrates the portion of first jet pump assembly 238 in second discrete pump configuration (e.g., a control position). Assembly body 246 is shown as transparent in FIG. 5A and FIG. 5B for clarity.

As used herein, a discrete pump configuration may mean a configuration wherein a translating member defines a specific positional relationship to another component and/or portion included in and/or defined by a jet pump assembly. As an example, a discrete pump configuration of first jet pump assembly 238 may mean a configuration wherein translating member 210 defines a specific positional relationship to another component and/or portion included in and/or defined by first jet pump assembly 238.

For example, as depicted in FIG. 5A, first jet pump assembly 238 may define a first discrete pump configuration (e.g., an open position) when a fixed point P1 of translating member 210 and a fixed point P2 of first jet pump assembly 238 define a first specific displacement D1. As depicted in FIG. 5B, first jet pump assembly 238 may define a second discrete pump configuration (e.g., a control position) when the fixed point P1 of translating member 210 and the fixed point P2 of first jet pump assembly 238 define a second specific displacement D2, wherein the second displacement D2 is different from the first displacement D1. In some examples, an internal body 202 of first jet pump assembly 238 may define a perimeter 206 defining flow area 198, and fixed point P2 is a fixed point on perimeter 206. In some examples, a discrete pump configuration means a position of translating member 210 which causes flow area 198 to define a certain area (e.g., as translating member passes within perimeter 206). For example, the first discrete pump configuration may cause flow area 198 to define a first area A1 and the second discrete pump configuration may cause flow area 198 to define a second area A2, wherein the first area A1 is different from the second area A2. First jet pump assembly 238 may define additional discrete pump configurations that describe a specific positional relationship to another component and/or portion included in and/or defined by first jet pump assembly 238. Likewise, second jet pump assembly 240, third jet pump assembly 242, and/or fourth jet pump assembly 244 may define discrete pump configurations in a manner similar to first jet pump assembly 238. In examples, each of first jet pump assembly 238, second jet pump assembly 240, third jet pump assembly 242, and fourth jet pump assembly 244 may define discrete pump configurations which include at least an open configuration for a respective jet pump assembly and a control configuration for the respective jet pump assembly.

Control circuitry 122 may cause jet pump system 118 to alter the system mixing ratio by causing one or more of jet pump assemblies 236 establish a discrete pump configurations, such as the open position or the closed position. In examples, control circuitry 122 is configured to cause the jet pump system 118 to alter the system mixing ratio by causing each of first jet pump assembly 238, second jet pump assembly 240, third jet pump assembly 242, fourth jet pump assembly 244, and/or other jet pump assemblies of jet pump assemblies 236 to assume a discrete pump configuration (e.g., to assume either an open position or a control position). In examples, control circuitry 122 is configured to cause jet pump system 118 to translate each jet pump assembly between the discrete pump configurations in order to alter the system mixing ratio. Jet pump system 118 may be configured to cause a jet pump assembly of jet pump assemblies 236 to assume any discrete pump configuration to control a system mixing ratio.

For example, jet pump system 118 may establish a first system mixing ratio by placing first jet pump assembly 238, second jet pump assembly 240, and third jet pump assembly 242 in their control positions while placing fourth jet pump assembly 244 or another jet pump assembly in its open position. Jet pump system 118 may establish a second system mixing ratio by placing first jet pump assembly 238 and second jet pump 240 assembly in their control positions while placing third jet pump assembly 242 and fourth jet pump assembly 244 in their open positions, or by otherwise placing first jet pump assembly 238, second jet pump 240 assembly, third jet pump assembly 242, and/or fourth jet pump assembly 244 in a discrete pump configuration different than that used to establish the first system mixing ratio. The jet pump system may establish a third system mixing ratio by placing first jet pump assembly 238 and third jet pump assembly 242 in their control positions while placing second jet pump assembly 240 and fourth jet pump assembly 244 in their open positions, or by otherwise placing first jet pump assembly 238, second jet pump 240 assembly, third jet pump assembly 242, and/or fourth jet pump assembly 244 in a discrete pump configuration different than that used to establish the first system mixing ratio or the second system mixing ratio. Hence, the jet pump system may be configured to substantially establish a system mixing ratio by placing each jet pump assembly of jet pump assemblies 236 in a discrete pump configuration, and may be configured to alter the system mixing ratio by altering the discrete pump configuration of one or more jet pump assemblies in jet pump assemblies 236. Altering the system mixing ratio by causing a jet pump assembly to transfer between discrete pump configurations (e.g., from an open position to a control position, or vice-versa) may simplify the architecture of jet pump system 118, resulting in, for example, cost and weight reduction, and may foster a reliability improvement through elimination of devices required for continuously variable modulation.

Figure 6:
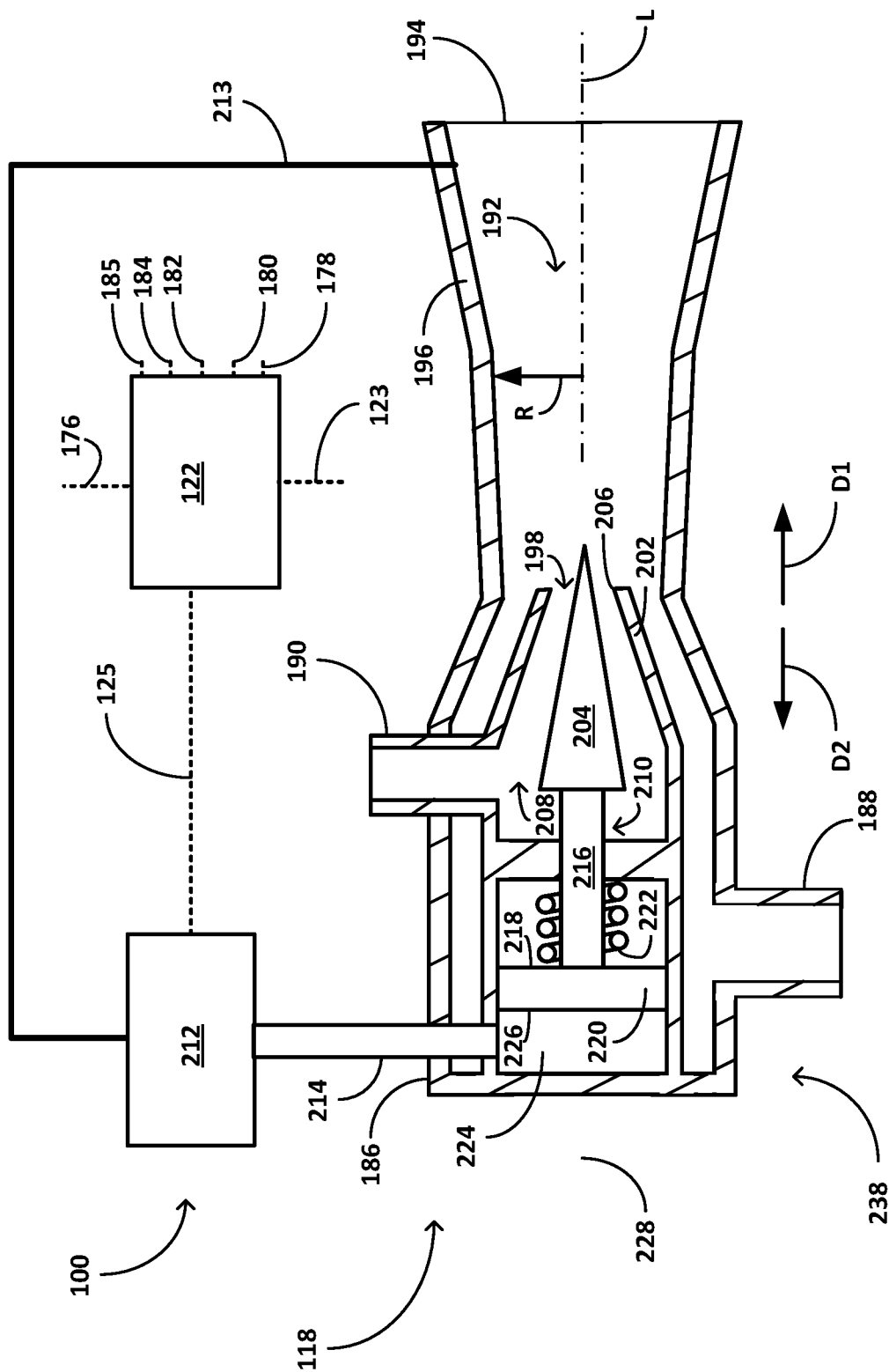
FIG. 6 is a schematic illustration of an example jet pump.

FIG. 6 is a conceptual diagram of an example bleed system 100 including an example first jet pump assembly 238 and control circuitry 122. Second jet pump assembly 240, third jet pump assembly 242, fourth jet pump assembly 244, and other jet pump assemblies in jet pump assemblies 236 may be configured similarly to first jet pump assembly 238. Portions of first jet pump assembly 238 are illustrated in cross-section with a cutting plane parallel to the page. A body 186 of first jet pump assembly 238 ("pump body 186") defines a first inlet 188 configured to receive a first gas flow (e.g., lower pressure gas via IP passage 250, such as flow FL1) and a second inlet 190 configured to receive a second gas flow (e.g., higher pressure gas via HP passage 248, such as flow FH1). First jet pump assembly 238 is configured to combine the first gas flow received via first inlet 188 and the second gas flow received via second inlet 190 to generate a mixed gas in an outlet region 192 defined by pump body 186. First jet pump assembly 238 is configured to issue a discharge gas stream (e.g., flow FM1) via a pump outlet 194 defined by pump body 186. In examples, first jet pump assembly 238 is configured to issue the discharge gas stream substantially along an axis L defined by first jet pump assembly 238 and intersecting pump outlet 194. Axis L may be perpendicular to the cutting plane of FIG. 3.

In examples, pump body 186 defines a diffuser 196 configured to allow an expansion of discharge gas stream as the discharge gas stream flows toward pump outlet 194. First jet pump assembly 238 may be configured such that the discharge gas stream expands and cools as the discharge gas stream flows through diffuser 196 toward pump outlet 194. First jet pump assembly 238 may be configured to cause the discharge gas stream to cool (e.g., to be at a lower temperature than the higher pressure gas provided through second inlet 190 alone) to reduce a cooling load on, for example, PCL 126 or another cooling component. In examples, first jet pump assembly 238 is configured to receive a higher pressure gas at a first temperature via one of first inlet 188 or second inlet 190 and a lower pressure gas at a second temperature less than the first temperature via the other of first inlet 188 or second inlet 190. Diffuser 196 may be configured such that as the discharge gas stream flows through outlet region 192 toward pump outlet 194, the expansion of the discharge gas stream results in a gas temperature less than at least the first temperature of the higher pressure gas. In examples, the diffuser 196 is configured such that the expansion results in a gas temperature less than the second temperature of the lower pressure gas. Diffuser 196 may substantially surround outlet region 192 and define an increasing flow area (or volume) for the discharge gas stream as the discharge gas stream flows within outlet region 192 toward pump outlet 194. For example, diffuser 196 may be configured such that a cross-sectional dimension R perpendicular to axis L and intersecting diffuser 196, increases as the mixed flow flows within outlet region 192 toward pump outlet 194. For example, dimension R may be a radius if pump body 186 is circular in cross-section (taken orthogonal to axis L).

First jet pump assembly 238 is configured to produce the discharge gas stream in outlet region 192 by at least mixing the first gas flow received via first inlet 188 and the second gas flow received via second inlet 190 in a mix proportion. The mix proportion defines the relative proportion of the second gas flow to the first gas flow combined when first jet pump assembly 238 produces the discharge gas stream. In examples, the mix proportion defines a ratio of a mass of a second gas of the second gas flow to a mass of a first gas of the first gas flow. The mass of the second gas and the mass of the first gas may be defined as mass quantities, mass flow rates, or any other mass-dependent parameters of the second gas flow and the first gas flow. The first gas and the second gas may be gases having the same or a substantially similar compositions. In examples, air comprises the first gas and the second gas.

In examples, the second gas flow has a pressure different from a pressure of the first gas flow. For example, one of the second gas flow or the first gas flow may be a portion of higher pressure gas received via conduit 116 (FIG. 1, 2) and the other of the second gas flow or the first gas flow may be a portion of lower pressure gas received via conduit 114. The mix proportion may define the relative proportion of the higher pressure gas to the lower pressure gas combined to produce the system mixing ratio.

First jet pump assembly 238 is configured to alter the mix proportion such that jet pump system 118 may establish a substantially steady-state system mixing ratio which produces a fluid parameter of the mixed gas satisfying the system setpoint for the fluid parameter sensed by sensor 124, 172, 174 (FIG. 1, 2). For example, if the fluid parameter sensed by sensor 124, 172 174 is a pressure and the system setpoint is a pressure setpoint, first jet pump assembly 238 may be configured alter the mix proportion such that jet pump system 118 may establish a substantially steady-state system mixing ratio that causes a certain amount of the second gas (e.g., a higher pressure gas) to mix with a certain amount of the first gas (e.g., the lower pressure gas) such that the mixed gas exiting jet pump system 118 generates a pressure at sensor 124, 172, 174 satisfying the pressure setpoint. In examples, jet pump system 118 is configured to substantially establish the steady-state system mixing ratio by controlling the mass flow of a higher pressure gas received from turbine engine 102 (e.g., via conduit 116 (FIG. 1,2)) and/or the lower pressure gas received from turbine engine 102 (e.g., from conduit 114). In examples, the system setpoint is defined by a range of values around a central setpoint value, and the fluid parameter of the mixed gas satisfies the system setpoint when the fluid parameter falls within the range. In examples, the system setpoint is defined by a specific setpoint value, and the fluid parameter of the mixed gas satisfies the system setpoint when the fluid parameter is substantially equal to (e.g., within 1%, 5%, 10%, or some other percentage of) the specific setpoint value.

Jet pump system 118 may be configured to control the mass flows using first jet pump assembly 238 and/or other jet pump assemblies of jet pump assemblies 236. For example, first jet pump assembly 238 define flow area 198 configured to enable passage therethrough of the second gas flow received via second inlet 190. In examples, flow area 198 is an area defined between internal body 202 and a restriction device 204. Internal body 202 may define perimeter 206 defining an opening for the second gas to flow into outlet region 192 from second inlet 190, and restriction device 204 may be configured to restrict the flow of the second gas through the opening defined by perimeter 206. In some examples, restriction device 204 is configured to insert into the opening defined by perimeter 206. Internal body 202 may define a chamber 208 configured to receive the second gas flow and cause the second gas to flow through the opening defined by perimeter 206. Internal body 202 may be, for example, a nozzle body, and restriction device 204 may be a needle configured to restrict flow through a nozzle opening defined by the nozzle body. Internal body 202 may be mechanically supported by pump body 186.

First jet pump assembly 238 may be configured to alter the mix proportion by altering a dimension of flow area 198. First jet pump assembly 238 may be configured such that the dimension of flow area 198 controls a mass flow of the second gas flow, such that the dimension of flow area 198 at least partially controls the system mixing ratio defined. In examples, translating member 210 configured to translate relative to pump body 186 to alter a dimension of flow area 198. Translating member 210 may include restriction device 204. In examples, translating member 210 and/or restriction device 204 is configured as a jet pump needle. Translating member 210 may be configured to cause restriction device 204 to translate relative to perimeter 206 when translating member 210 translates relative to pump body 186. Restriction device 204 may be configured to alter the dimension of flow area 198 when restriction device 204 translates. For example, restriction device 204 may be configured to decrease flow area 198 when restriction device 204 translates in a first direction D1 toward perimeter 206. Restriction device 204 may be configured to increase a flow area 198 when restriction device 204 translates in a second direction D2 away from perimeter 206. Hence, first jet pump assembly 238 may be configured to alter the mix proportion of the second gas flow (e.g., the higher gas flow) to the first gas flow (e.g., the lower gas flow) combined to produce the discharge gas stream in outlet region 192 by causing a translation of translating member 210, e.g., under the control of control circuitry 122.

In examples, bleed system 100 includes a device 212 configured to exert a mechanical force on first jet pump assembly 238 to cause first jet pump assembly 238 to alter the mix proportion. Control circuitry 122 may be configured to cause device 212 to exert the mechanical force on first jet pump assembly 238. In examples, device 212 is configured to cause translating member 210 to translate when device 212 exerts the mechanical force on first jet pump assembly 238. Device 212 may be configured to exert the mechanical force on first jet pump assembly 238 in any suitable manner. In some examples, device 212 is configured to provide a pressurized control fluid (e.g., air, fuel, or hydraulic fluid) via a control fluid conduit 214 to first jet pump assembly 238 to exert the mechanical force on first jet pump assembly 238. Device 212 may include, for example, a torque motor configured to provide the pressurized control fluid. In some examples, the torque motor is configured to receive an inlet flow of gas from bleed system 100, an engine fuel system, or an aircraft hydraulic system and generate the pressurized control fluid using the inlet flow. In some examples, device 212 includes an electric motor configured to generate a torque and/or linear force to exert the mechanical force on first jet pump assembly 238. For example, device 212 may be configured to rotate a nut threadably engaged with first jet pump assembly 238 to exert the mechanical force on first jet pump assembly 238. In some examples, device 212 includes a linear motor configured to generate a linear thrust to exert the mechanical force on first jet pump assembly 238.

Control circuitry 122 may be configured to transmit a control signal to device 212 to cause device 212 to exert the mechanical force on first jet pump assembly 238. In examples, control circuitry 122 is configured to transmit the control signal to device 212 via communication link 125. Device 212 may be configured to exert the mechanical force on first jet pump assembly 238 in response to the control signal received, such that the control signal from control circuitry 122 causes first jet pump assembly 238 to alter its mix proportion. Control circuitry 122 is configured to transmit the control signal to device 212 in response to a signal indicative of a fluid parameter received from sensor 124 (FIG. 1, 2) via communication link 123. In examples, control circuitry 122 is configured to compare the indicative signal to a system setpoint (e.g., a system setpoint received via communication link 176) and transmit the control signal to device 212 via communication link 125 based on the comparison. In some example, control circuitry 122 is configured to establish the system setpoint based on one or more load signals received via communication links 178, 180, 182, 184, 185.

For example, control circuitry 122 may receive a signal from sensor 124, 172 or 174 (FIG. 1, 2) via communication link 123 indicative of a fluid parameter of the mixed gas at a location within bleed system 100, such as supply conduit 120. Control circuitry 122 may compare the indicative signal to a system setpoint and, based on the comparison, transmit a control signal via communication link 125 causing device 212 to exert a mechanical force on first jet pump assembly 238. First jet pump assembly 238 may alter the mix proportion of the second gas flow received via second inlet 190 (e.g., a higher pressure gas received via conduit 116) to the first gas flow received via first inlet 188 (e.g., a lower pressure gas received via conduit 114) in response to the mechanical force. For example first jet pump assembly 238 may alter the mix proportion by transitioning from a first discrete pump configuration, such as an open position, to a second discrete pump configuration, such as a control position, or vice-versa. The altered mix proportion may alter the fluid parameter of the discharge gas stream within outlet region 192 of first jet pump assembly 238. The altered fluid parameter of the discharge gas stream may cause the fluid parameter of the mixed gas at the location within bleed system 100 to alter. Sensor 124, 172, 174 may sense the altered fluid parameter within bleed system 100 and communicate a signal indicative of the altered fluid parameter to control circuitry 122. When the signal indicative of the altered fluid parameter indicates a fluid parameter satisfying the system setpoint, control circuitry 122 may communicate with device 212 to cause device 212 to cease causing first jet pump assembly 238 to alter the mix proportion.

In examples, first jet pump assembly 238 is configured such that the mechanical force exerted by device 212 causes translating member 210 to translate to alter the mix proportion. In examples, translating member 210 includes a shaft 216 configured to translate relative to pump body 186 when the mechanical force is exerted on shaft 216. Shaft 216 may be configured to cause restriction device 204 to translate when shaft 216 translates. In examples, first jet pump assembly 238 is configured to cause the control fluid received via conduit 214 to exert the force on shaft 216. For example, first jet pump assembly 238 may be configured to cause the control fluid to exert a pressure on a pressure area 218 defined by first jet pump assembly 238 to exert the mechanical force on first jet pump assembly 238. First jet pump assembly 238 may be configured to cause shaft 216 to translate when the control fluid exerts the mechanical force on pressure area 218. In some examples, first jet pump assembly 238 includes a piston 220 defining pressure area 218 and configured such that the pressure exerted on pressure area 218 causes piston 220 to exerts a force on shaft 216, causing shaft 216 to translate relative to pump body 186. Translation of shaft 216 relative to pump body 186 may cause translation of restriction device 204 relative to perimeter 206, altering a dimension of flow area 198 and altering the mix proportion of the discharge gas stream produced by first jet pump assembly 238.

In some examples, first jet pump assembly 238 is configured to produce a resisting force opposing the mechanical force exerted by device 212, such that first jet pump assembly 238 may be caused to both increase and decrease the mix proportion by a mechanical force which acts in a single direction. The resisting force produced by first jet pump assembly 238 may allow device 212 to be configured to generate the mechanical force in only a single direction (e.g., the single direction produced when a control fluid acts on pressure area 218), as opposed to requiring a configuration of device 212 capable of exerting the mechanical force in multiple directions. In examples, first jet pump assembly 238 is configured such that the resisting force produced causes translation of translating member 210 in a direction (e.g., the direction D1) substantially opposite a translating direction (e.g., the direction D2) of translating member 210 caused by the mechanical force exerted by device 212. First jet pump assembly 238 may be configured to alter the mix proportion when the mechanical force on translating member 210 provided by device 212 is either greater than or less than the resisting force on translating member 210 provided by first jet pump assembly 238. For example, first jet pump assembly 238 may be configured such that when the mechanical force exerted on translating member 210 is greater than the resisting force exerted on translating member 210, translating member 210 translates in the direction D2 to alter the mix proportion. First jet pump assembly 238 may be configured such that when the mechanical force exerted on translating member 210 is less than the resisting force exerted on translating member 210, translating member 210 translates in the direction D1 to alter the mix proportion. Hence, first jet pump assembly 238 may be configured such that variation in a magnitude of the mechanical force exerted by device 212 causes first jet pump assembly 238 to alter the mix proportion, such that device 212 may be configured to exert the mechanical force in only a single direction.

First jet pump assembly 238 may be configured to establish a steady-state (e.g., unaltering and/or unvarying) mix proportion when the mechanical force exerted on translating member 210 substantially equals the resisting force exerted on translating member 210 by first jet pump assembly 238. First jet pump assembly 238 may be configured such that when device 212 exerts a mechanical force on translating member 210 which substantially equals the resisting force exerted on translating member 210 by first jet pump assembly 238, first jet pump assembly 238 establishes translating member 210 in a substantially stationary position relative to pump body 186 to establish a substantially steady-state mix proportion.

In examples, first jet pump assembly 238 includes a compressible and/or extendable element 222 such as a spring to generate the resisting force. Element 222 may be configured such that it fully opens the area of the nozzles of the jet pump (e.g., flow area 198), when no pressure is applied by device 212. In some examples, first jet pump assembly 238 (e.g., pump body 186) defines a chamber 224 configured to hold a compressible gas (e.g., air) which acts against a second pressure area 226 to generate the resisting force. Second pressure area 226 may be, for example, an area on a side of piston 220 opposite the side defining pressure area 218. Chamber 224 may be configured such that, when the mechanical force exerted by device 212 causes a compression of the gas within chamber 224, the compression of the gas causes chamber 224 to the generate the resisting force in a direction opposing the mechanical force.

First jet pump assembly 238 may be configured to vary a magnitude of the resisting force based on a position of translating member 210, such that the mix proportion established by first jet pump assembly 238 is based on a magnitude of the mechanical force exerted by device 212. For example, compressible element 222 may be configured such that the resisting force increases as compressible element 222 is further compressed and/or extended. Chamber 224 may be configured such that the resisting force increases as a gas within chamber 224 is further compressed. This may provide a measure of feedback to reduce overshoot, response time, settling time, and/or other control characteristics when control circuitry 122 causes first jet pump assembly 238 to alter the mix proportion in response to a signal from sensor 124. For example, when device 212 is configured to provide a control fluid via control fluid conduit 214 to exert the mechanical force by acting on pressure area 226, control circuitry 122 may cause the indicative signal to smoothly approach a system setpoint by directing device 212 to increase or decrease the pressure of the control fluid as the system setpoint is approached. This may increase the responsiveness of bleed system 100 when control circuitry 122 changes a system setpoint for the fluid parameter based on a setpoint signal received via communication link 176 and/or one or more loads signals received via communication links 178, 180, 182, 184, 185.

In examples, bleed system 100 is configured to provide a pneumatic feedback to first jet pump assembly 238 to cause first jet pump assembly 238 to alter the mix proportion. Bleed system 100 may be configured to substantially sense a parameter of the mixed gas at a location in bleed system 100 using feedback line 213 and provide the sensed parameter to first jet pump assembly 238, device 212, and/or another component of bleed system 100 to cause first jet pump assembly 238 to alter the mix proportion. In examples, the sensed parameter is a pressure and feedback line 213 is a pneumatic feedback line configured to substantially port a portion of the mixed gas to first jet pump assembly 238, device 212, and/or another component of bleed system 100 from the sensed location. Feedback line 213 may sense the mixed gas at any location within bleed system 100. In examples, feedback line 213 is configured to sense the fluid parameter at a location substantially defined by diffuser 196. In some examples, feedback line 213 is configured to port some portion of the discharge gas stream from diffuser 196 to device 212 to cause first jet pump assembly 238 to alter the mix proportion.

Device 212 may be configured to vary the magnitude of the mechanical force exerted on first jet pump assembly 238 to cause first jet pump assembly 238 to alter the mix proportion. Device 212 may be configured to vary the magnitude of the mechanical force to, for example, cause the mechanical force to exceed the resistance force or cause the resistance force to exceed the mechanical force in order to alter the mix proportion. For example, device 212 may be configured to increase or decrease a pressure of the control fluid received by first jet pump assembly 238 via control fluid conduit 214 to vary the magnitude of the mechanical force exerted. Device 212 may be configured to vary a rotary torque or linear force exerted on first jet pump assembly 238 to vary the magnitude of the mechanical force exerted. In examples, device 212 is configured to vary the magnitude of the force exerted based on the control signal received from control circuitry 122 via communication link 125. In examples, device 212 is configured to vary the magnitude based on a signal characteristic (e.g., a frequency and/or amplitude) of the signal received from control circuitry 122.

In examples, first jet pump assembly 238 is configured to utilize air as the control fluid. Device 212 may be configured to pressurize the air and provide the pressurized air as the control fluid via control fluid conduit 214. The use of air as a control fluid may improve a responsiveness and/or reliability of first jet pump assembly 238 in higher temperature environments, such as environments in close proximity to an operating engine such as turbine engine 102. In examples, first jet pump assembly 238 is configured to operate within an environment having a temperature greater than about 300 degrees Celsius (572 degrees Fahrenheit), greater than about 400 degrees Celsius (572 degrees Fahrenheit), and/or 500 degrees Celsius (932 degrees Fahrenheit). In other examples, first jet pump assembly 238 and device 212 may be configured to use a different fluid as the control fluid, such as water, oil, or another hydraulic fluid.

In examples, first jet pump assembly 238 is configured to "fail open," such that in the absence of a force (e.g., a mechanical force, a pneumatic or hydraulic force, and electromagnetic force, or another force) causing first jet pump assembly 238 to close or occlude flow area 198, first jet pump assembly 238 assume a discrete pump configuration allowing a higher pressure gas portion (e.g., flow FH1) to flow through flow area 198. In examples, first jet pump assembly 238 is configured to substantially establish the open configuration when first jet pump assembly 238 fails open. Likewise and in similar manner, second jet pump assembly 240, third jet pump assembly 242, fourth jet pump assembly 244, and/or other jet pump assemblies in jet pump assemblies 236 may be configured to fail open.

Figure 7:
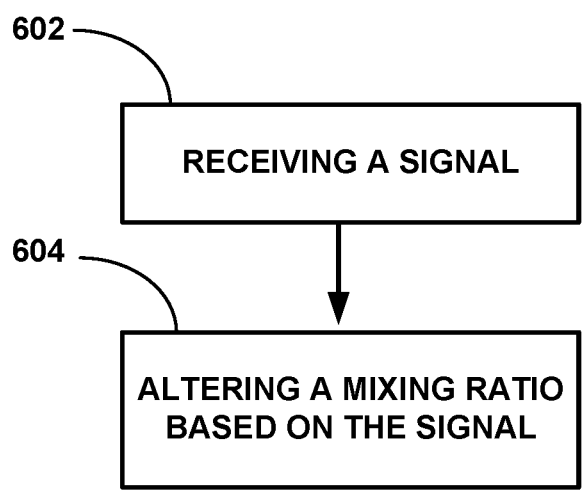
FIG. 7 is a flow diagram illustrating an example method of producing a mixed gas.

FIG. 7 illustrates a flow diagram of an example technique for controlling a mixed gas within a bleed system. Although the technique is described with reference to jet pump system 118 (FIGS. 1-3), in other examples, the technique may be used with device. In addition, control circuitry 122 alone or in combination with controllers of other devices can perform any part of the technique shown in FIG. 4.

Control circuitry 122 receives a signal indicative of a fluid parameter of a mixed gas (402). The signal may indicate the fluid parameter of the mixed gas in a bleed system 100 configured to provide the mixed gas to one or more gas loads 134, such as ECS 136, tank system 138, ADU 140, and/or anti-icing system 142. The one or more gas loads may be configured to operate as transient loads within bleed system 100, such that the overall demands of gas loads 134 may vary during operation of bleed system 100. In examples, control circuitry 122 receives the indicative signal from sensor 124, 172, 174 configured to sense the fluid parameter of the mixed gas within bleed system 100. The fluid parameter may be, for example, a pressure, a temperature, a flow rate, or some other fluid parameter of the mixed gas within bleed system 100.

Control circuitry 122 causes jet pump system 118 to alter the system mixing ratio based on the signal indicative of the fluid parameter received (404). In examples, control circuitry 122 compares the indicative signal to a system setpoint and causes jet pump system 118 to alter the system mixing ratio based on the comparison. Control circuitry 122 may be configured to receive the system setpoint via communication link 176 or establish the system setpoint, e.g., as described below. Control circuitry 122 is configured to cause jet pump system 118 to respond to varying setpoints. For example, control circuitry 122 may receive a first setpoint and cause jet pump system 118 to alter the system mixing ratio such that the fluid parameter sensed by sensor 124 substantially matches and/or satisfies the system setpoint. Control circuitry 122 may subsequently receive a second setpoint different from the first setpoint and cause jet pump system 118 to alter the system mixing ratio such that the fluid parameter sensed by sensor 124, 172, 174 substantially matches and/or satisfies the second setpoint.

In some examples, control circuitry 122 is configured to establish the system setpoint. In examples, control circuitry receives one or more load signals from gas loads 134 via communication links 178, 180, 182, 184, 185 and establishes the system setpoint based on the one or more load signals.

Control circuitry 122 may cause jet pump system 118 alter the system mixing ratio by altering a mix proportion of one or more of first jet pump assembly 238, second jet pump assembly 240, third jet pump assembly 242, fourth jet pump assembly 244, or another jet pump assembly within jet pump assemblies 236. Control circuitry 122 may cause jet pump system 118 to alter one or more of the mix proportions to at least alter a mass flow of the higher pressure gas and/or the lower pressure gas received from turbine engine 102 as jet pump system 118 produces the mixed gas. For example, if first jet pump assembly 238 defines flow area 198 to control a mass flow through first jet pump assembly 238, control circuitry 122 may cause first jet pump assembly 238 to alter a dimension of flow area 198 to alter its mix proportion, such as by causing first jet pump assembly 238 to translate restriction device 204 to alter the dimension of flow area 198.

In examples, control circuitry 122 may cause jet pump system 118 to alter the system mixing ratio by causing one or more of first jet pump assembly 238, second jet pump assembly 240, third jet pump assembly 242, fourth jet pump assembly 244, or another jet pump assembly within jet pump assemblies 236 to transition from a first discrete pump configuration (e.g., an open position) to a second discrete pump configuration (e.g., a control position).

In examples, control circuitry 122 is configured to cause device 212 to exert a mechanical force on first jet pump assembly 238 to cause first jet pump assembly 238 to alter the mix proportion. Device 212 may be configured to cause translating member 210 to translate when control circuitry causes device 212 to exert the mechanical force. In examples, device 212 is configured to provide a pressurized control fluid (e.g., air) via a control fluid conduit 214 to first jet pump assembly 238 to exert the mechanical force by acting on pressure area 226. In some examples, device 212 includes an electric motor configured to generate a torque and/or linear force to exert the mechanical force on first jet pump assembly 238.

Device 212 may exert the mechanical force in a single direction on first jet pump assembly 238 to cause first jet pump assembly 238 to alter the mix proportion (e.g., to increase or decrease the mix proportion). First jet pump assembly 238 may produce a resisting force opposing the mechanical force exerted by device 212. first jet pump assembly 238 may alter the mix proportion when the mechanical force on translating member 210 provided by device 212 is either greater than or less than the resisting force on translating member 210 provided by first jet pump assembly 238. In examples, first jet pump assembly 238 generates the resisting force using compressible and/or extendable element 222 and/or chamber 224. first jet pump assembly 238 may vary a magnitude of the resisting force based on a position of translating member 210, such that the mix proportion established by first jet pump assembly 238 is based on a magnitude of the mechanical force exerted by device 212.

In examples, control circuitry 122 causes device 212 to vary the magnitude of the mechanical force exerted on first jet pump assembly 238 to cause first jet pump assembly 238 to alter the mix proportion. Control circuitry may cause device 212 to vary the magnitude of the mechanical force by transmitting a control signal to device 212 via communication link 125. Control circuitry 122 may cause device 212 to vary the magnitude of the mechanical force to cause the mechanical force to exceed the resistance force or cause the resistance force to exceed the mechanical force. In examples, control circuitry 122 causes device 212 to increase or decrease a pressure of the control fluid received by first jet pump assembly 238 via control fluid conduit 214 to vary the magnitude of the mechanical force. In examples, control circuitry 122 causes device 212 to vary a rotary torque or linear force exerted on first jet pump assembly 238 to vary the magnitude of the mechanical force.

Control circuitry 122 may include any suitable arrangement of hardware, software, firmware, or any combination thereof, to perform the techniques attributed to control circuitry 122 herein. Examples of control circuitry 122 include any one or more microprocessors, digital signal processors (DSPs), application specific integrated circuits (ASICs), field programmable gate arrays (FPGAs), or any other equivalent integrated or discrete logic circuitry, as well as any combinations of such components. When control circuitry 122 includes software or firmware, control circuitry 122 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

A system setpoint for bleed system 100 may be stored in a memory of control circuitry 122 or in another device communicatively coupled to control circuitry 122. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing control circuitry 122 described herein to perform the actions attributed to it.

Communication links 123, 125, 176, 178, 180, 182, 184, 185 may be hard-line and/or wireless communications links. Communication links 123, 125, 176, 178, 180, 182, 184, 185 may comprise some portion of control circuitry 122, sensor 124, and/or one or more of gas loads 134. Communication links 123, 125, 176, 178, 180, 182, 184, 185 may comprise a wireless Internet connection, a direct wireless connection such as wireless LAN, Bluetooth™, Wi-Fi™, and/or an infrared connection. Communication links 123, 125, 176, 178, 180, 182, 184, 185 may utilize any wireless or remote communication protocol.

Sensor 124, bleed temperature sensor 168, manifold temperature sensor 170, first manifold pressure sensor 172, and/or second manifold pressure sensor 174 (collectively "bleed system sensors") may be configured to generate a signal indicative of a fluid parameter at any location within bleed system 100. One or more of the bleed system sensors may be configured to generate the signal as a result of an interaction with the mixed gas within bleed system 100. One or more of the bleed system sensors may include a transducer configured to transduce the interaction into the signal indicative of the fluid parameter. The indicative signal may be an analog electrical signal or a digital signal. In some examples, one or more of the bleed system sensors may include processing circuitry configured to interpret a response of the transducer and generate the indicative signal, and/or control circuitry 122 may include processing circuitry configured to interpret a response of the transducer and generate the indicative signal. One or more of the bleed system sensors may be configured to communicate the indicative signal indicative to other devices in data communication the one or more of the bleed system sensors.

Intermediate pressure check valve 146, high pressure valve 148, jet pump system bypass valve 150, mid-pressure valve 152, over pressure shut off valve 154, fan air valve 156, flow control valve 160, valve 162, valve 164, and/or valve 166 (collectively "bleed system valves") may be configured to operate in any manner and with any type of valve operation system. One or more of the bleed system valves may be a pneumatically operated valve, a hydraulically operated valve, a manually operated valve, a motor-driven valve, or a valve configured to operate in another manner. One or more of the bleed system valves may be configured to operate based on a communication from control circuitry 122 or other control circuitry. Control circuitry 122 or the other control circuitry may be configured to cause operation of one or more of the bleed system valves based on the fluid parameter of the mixed gas within bleed system 100, other parameters within bleed system 100, other operations conducted by aircraft 104, and/or other reasons.

The techniques described in this disclosure, including those attributed to control circuitry 122 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components, and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The disclosure includes the following examples.

Example 1: A system comprising: a jet pump system configured to receive a lower pressure gas from a lower pressure stage of a turbine engine and receive a higher pressure gas from a higher pressure stage of the turbine engine, wherein the jet pump system is configured to combine the lower pressure gas and the higher pressure gas to produce a mixed gas, and wherein the jet pump is configured alter a system mixing ratio of the higher pressure gas to the lower pressure gas combined when the jet pump system produces the mixed gas; and control circuitry configured to receive a signal indicative of a fluid parameter of the mixed gas, wherein the control circuitry is configured to cause the jet pump to alter the system mixing ratio based on the signal.

Example 2: The system of example 1, wherein the control circuitry is configured to determine a setpoint for the fluid parameter, and wherein the control circuitry is configured to compare the fluid parameter indicated by the signal with the setpoint and control the jet pump system to alter the system mixing ratio based on the comparison.

Example 3: The system of example 1 or example 2, wherein the control circuitry is configured to receive a load signal from a load configured to receive the mixed gas, wherein the control circuitry is configured to determine the setpoint based on the load signal.

Example 4: The system of any of examples 1-3, further comprising a load configured to receive the mixed gas, wherein the control circuitry is configured to cause the jet pump system to alter the system mixing ratio when the load receives the mixed gas, and wherein the load comprises one or more of: an environmental control system configured to provide air to a cabin and enable a heat transfer between the mixed gas and the air, an air drive unit configured to pressurize a hydraulic system using the mixed gas, an anti-icing system configured to cause the removal of ice from an aircraft wing, a tank system, or a pneumatic system configured to receive the mixed gas.

Example 5: The system of any of examples 1-4, wherein: the jet pump system is configured to receive a flow of the higher pressure gas and a flow of the lower pressure gas, the jet pump system is configured to mix the flow of the higher pressure gas and the flow of lower pressure gas to produce the mixed gas, and the jet pump system is configured to alter the flow of the higher pressure gas to alter the mixing ratio.

Example 6: The system of any of examples 1-5, further comprising a sensor configured to sense the fluid parameter of the mixed gas, wherein the sensor is configured to communicate the signal to the control circuitry.

Example 7: The system of any of examples 1-6, wherein the jet pump system comprises at least a first jet pump assembly and a second jet pump assembly, and wherein the jet pump system is configured to mix a first discharge gas stream from the first jet pump assembly and a second discharge gas stream from the second jet pump assembly to produce the mixed gas.

Example 8: The system of example 7, wherein at least the first jet pump assembly is configured to establish a discrete pump configuration to produce the first discharge gas stream.

Example 9: The system of example 7 or example 8, wherein at least the first jet pump assembly is configured to combine a portion of the lower pressure gas and a portion of the higher pressure gas to produce the first discharge gas stream, and wherein the first jet pump assembly is configured alter a mix proportion of the portion of the higher pressure gas to the portion of the lower pressure gas combined when the first jet pump assembly produces the first discharge gas stream.

Example 10: The system of example 9, wherein: the second jet pump assembly is configured to combine a second portion of the lower pressure gas and a second portion of the higher pressure gas to produce the second discharge gas stream, the second jet pump assembly is configured alter a second mix proportion of the second portion of the higher pressure gas to the second portion of the lower pressure gas combined when the second jet pump assembly produces the second discharge gas stream, and the control circuitry is configured to cause at least of jet pump system to alter at least one of the first mix proportion or the second mix proportion to the jet pump system to alter the system mixing ratio.

Example 11: the system of any of examples 8-10, wherein the second jet pump assembly is configured to establish a second discrete pump configuration to produce the second discharge gas stream, and wherein the control circuitry is configured to cause the jet pump system to alter the system mixing ratio by at least one of: causing the first jet pump assembly to transition from the first discrete pump configuration to a third discrete pump configuration, or causing the second jet pump assembly to transition from the second discrete pump configuration to a fourth discrete pump configuration.

Example 12: The system of any of examples 1-11, wherein the jet pump system includes one or more diffusers configured to expand at least a portion of the mixed gas, and wherein the signal is indicative of a fluid parameter of the expanded portion of the mixed gas.

Example 13: The system of any of examples 1-12, wherein the jet pump system is configured to issue a flow of the mixed gas in an upstream direction to one or more gas loads configured to receive the mixed gas, and wherein the signal is indicative of a fluid parameter of the mixed gas downstream of the one or more gas loads.

Example 14: The system of any of examples 1-13, wherein at least the first jet pump assembly of claim 7 includes a pump body and a variable nozzle, wherein the variable nozzle is configured to translate relative to the pump body to alter the mixing ratio, and wherein the control circuitry is configured to cause the jet pump system to alter the mixing ratio by at least translating the variable nozzle relative to the pump body.

Example 15: The system of any of examples 1-14, wherein the jet pump system is configured to alter the mixing ratio based on a control signal received from the control circuitry, wherein the control circuitry is configured to generate the control signal based on the signal indicative of the fluid parameter.

Example 16: The system of any of examples 1-15, further comprising a device configured to exert a mechanical force on at least the first jet pump assembly of claim 7 to cause the first jet pump assembly of claim 7 to alter the mix proportion of claim 9, wherein the device is configured to exert the mechanical force on the first jet pump assembly of claim 7 in response to a control signal, and wherein the control circuitry is configured to communicate the control signal to the device.

Example 17: The system of example 16, wherein the device is configured to vary an amount of the mechanical force exerted on the first jet pump assembly of claim 7 based on a signal characteristic of the control signal, and wherein the first jet pump assembly of claim 7 is configured to establish the mix proportion of claim 9 based on the amount of the mechanical force.

Example 18: The system of any of examples 1-17, wherein: the device is configured to exert the mechanical force using a control fluid having a pressure, the device is configured to vary the pressure of the control fluid to vary the amount of the mechanical force, and the device is configured to establish the pressure of the control fluid based on the value of the control signal.

Example 19: The system of any of examples 1-18, further comprising the turbine engine, wherein the turbine engine is configured to increase a pressure of an gas stream as the gas stream flows from an initial compressor stage to a penultimate compressor stage to a final compressor stage, wherein the penultimate compressor stage is configured to issue a compressed gas to the final compressor stage, wherein the final compressor stage is configured to issue the compressed gas to a combustion chamber, and wherein the system is configured to provide the higher pressure gas from the gas stream prior to the gas stream flowing to one of the penultimate compressor stage or the final compressor stage.

Example 20: A system, comprising: a jet pump system configured to receive a lower pressure gas from a lower pressure stage of a turbine engine and receive a higher pressure gas from a higher pressure stage of the turbine engine; wherein the jet pump system is configured to combine the lower pressure gas and the higher pressure gas to produce a mixed gas, wherein the jet pump system is configured alter a mixing ratio of the higher pressure gas to the lower pressure gas combined when the jet pump system produces the mixed gas, and wherein the jet pump system is configured to issue a flow of the mixed gas in a downstream direction to a load configured to receive the mixed gas; and control circuitry, wherein: the control circuitry is configured to receive a signal indicative of a fluid parameter of the mixed gas upstream of the load, the control circuitry is configured to determine a setpoint for the fluid parameter, and the control circuitry is configured to cause the jet pump to alter the mixing ratio based on a comparison of the signal and the setpoint.

Example 21: The system of example 20, wherein the control circuitry is configured to receive a load signal from the load, wherein the control circuitry is configured to determine the setpoint based on the load signal.

Example 22: The system of example 20 or example 21, wherein the jet pump system is configured to alter the mixing ratio based on a control signal received from the control circuitry, wherein the control circuitry is configured to generate the control signal based on the comparison of the signal and the setpoint.

Example 23: The system of any of examples 20-22, further comprising a sensor configured to sense the fluid parameter of the mixed gas upstream of the load, wherein the sensor is configured to communicate the signal to the control circuitry.

Example 24: A method comprising: receiving, by control circuitry, a signal indicative of a fluid parameter of a mixed gas in a distribution system, wherein the mixed gas is generated by a jet pump system configured to mix a lower pressure gas and a higher pressure gas to produce the mixed gas; and altering, by the control circuitry, a mixing ratio of the higher pressure gas to the lower pressure gas combined by the jet pump system to produce the mixed gas based on the signal received.

Example 25: The method of example 24, further comprising: receiving, by the control circuitry, a load signal from a load configured to receive the mixed gas from the distribution system; determining, by the control circuitry, a setpoint for the fluid parameter; comparing, by the control circuitry, the fluid parameter indicated by the signal with the setpoint; and altering, by the control circuitry, the mixing ratio based on the comparison.

Example 26: A system comprising: a jet pump system configured to receive a lower pressure gas from a lower pressure stage of a turbine engine and receive a higher pressure gas from a higher pressure stage of the turbine engine, the jet pump system comprising: a first jet pump assembly configured to combine a first portion of the lower pressure gas and a first portion of the higher pressure gas to produce a first discharge gas stream, wherein the first jet pump assembly is configured alter a first mix proportion of the portion of the higher pressure gas to the portion of the lower pressure gas combined to produce the first discharge gas stream, and a second jet pump assembly configured to combine a second portion of the lower pressure gas and a second portion of the higher pressure gas to produce a second discharge gas stream, wherein the second jet pump assembly is configured alter a second mix proportion of the second portion of the higher pressure gas to the second portion of the lower pressure gas combined to produce the second discharge gas stream, and wherein the jet pump system is configured to mix the first discharge gas stream and the second discharge gas stream to produce a mixed gas; and control circuitry configured to receive a signal indicative of a fluid parameter of the mixed gas, wherein the control circuitry is configured to cause the jet pump system to alter at least one of the first mix proportion or the second mix proportion based on the signal.

Example 27: The system of example 26, wherein at least the first jet pump assembly is configured to establish one or more discrete pump configurations, and wherein the control circuitry is configured to cause the first jet pump assembly to establish one of the one or more discrete pump configurations based on the signal.

Example 28: The system of example 26 or example 27, wherein each discrete pump configuration establishes a defined flow area within the first jet pump assembly, and wherein the first jet pump assembly is configured to cause the first portion of the higher pressure gas to flow through the defined flow area.

Example 29: The system of any of examples 26-28, wherein the first jet pump assembly includes a translating member and a nozzle body, and wherein the first jet pump assembly is configured to establish each discrete pump configuration by positioning the translating member at a specific position relative to the nozzle body.

Example 30: The system of any of examples 26-29, wherein the second jet pump assembly is configured to establish one or more second discrete pump configurations, wherein the control circuitry is configured to cause the second jet pump assembly to establish one of the one or more second discrete pump configurations based on the signal.

Example 31: The system of any of examples 26-30, wherein the control circuitry is configured to determine a setpoint for the fluid parameter, and wherein the control circuitry is configured to compare the fluid parameter indicated by the signal with the setpoint and cause the jet pump system to alter the at least one of the first mix proportion or the second mix proportion based on the comparison.

Example 32: The system of example 31, wherein the control circuitry is configured to receive a load signal from a load configured to receive the mixed gas, wherein the control circuitry is configured to determine the setpoint based on the load signal.

Example 33: The system of any of examples 26-33, further comprising a load configured to receive the mixed gas, wherein the control circuitry is configured to cause the jet pump system to alter the at least one of the first mix proportion or the second mix proportion when the load receives the mixed gas.

Example 34: The system of example 33, wherein the load comprises one or more of: an environmental control system configured to provide air to a cabin and enable a heat transfer between the mixed gas and the air, an air drive unit configured to pressurize a hydraulic system using the mixed gas, an anti-icing system configured to cause the removal of ice from an aircraft wing, a tank system, or a pneumatic system configured to receive the mixed gas.

Example 35: The system of any of examples 26-34, further comprising a sensor configured to sense the fluid parameter of the mixed gas, wherein the sensor is configured to communicate the signal to the control circuitry.

Example 36: The system of any of examples 26-35, wherein the first jet pump assembly is configured to establish a first discrete pump configuration to produce the first discharge gas stream, wherein the second jet pump assembly is configured to establish a second discrete pump configuration to produce the second discharge gas stream, and wherein the control circuitry is configured to cause the jet pump system to alter a system mixing ratio by at least one of: causing the first jet pump assembly to transition from the first discrete pump configuration to a third discrete pump configuration, or causing the second jet pump assembly to transition from the second discrete pump configuration to a fourth discrete pump configuration.

Example 37: The system of any of examples 26-36, wherein the jet pump system includes one or more diffusers configured to expand at least a portion of the mixed gas, and wherein the signal is indicative of a fluid parameter of the expanded portion of the mixed gas.

Example 38: The system of any of examples 26-37, wherein the jet pump system is configured to issue a flow of the mixed gas in an upstream direction to one or more gas loads configured to receive the mixed gas, and wherein the signal is indicative of a fluid parameter of the mixed gas downstream of the one or more loads.

Example 39: The system of any of examples 26-38, further comprising a device configured to exert a mechanical force on at least the first jet pump assembly to cause the first jet pump assembly to alter the first mix proportion, wherein the device is configured to exert the mechanical force on the first jet pump assembly in response to a control signal, and wherein the control circuitry is configured to communicate the control signal to the device.

Example 40: The system of any of examples 26-39, further comprising the turbine engine, wherein the turbine engine is configured to increase a pressure of an gas stream as the gas stream flows from an initial compressor stage to a penultimate compressor stage to a final compressor stage, wherein the penultimate compressor stage is configured to issue the compressed gas to the final compressor stage, wherein the final compressor stage is configured to issue the compressed gas to a combustion chamber, and wherein the system is configured to provide the higher pressure gas from the gas stream prior to the gas stream flowing to one of the penultimate compressor stage or the final compressor stage.

Example 41: A system comprising: a jet pump system configured to receive a lower pressure gas from a lower pressure stage of a turbine engine and receive a higher pressure gas from a higher pressure stage of the turbine engine, the jet pump system comprising: a first jet pump assembly configured to combine a first portion of the lower pressure gas and a first portion of the higher pressure gas to produce a first discharge gas stream, wherein the first jet pump assembly is configured alter a first mix proportion of the portion of the higher pressure gas to the portion of the lower pressure gas combined to produce the first discharge gas stream, and wherein the first jet pump assembly is configured to establish a first discrete pump configuration to produce the first discharge gas stream and a second jet pump assembly configured to combine a second portion of the lower pressure gas and a second portion of the higher pressure gas to produce a second discharge gas stream, wherein the second jet pump assembly is configured alter a second mix proportion of the second portion of the higher pressure gas to the second portion of the lower pressure gas combined to produce the second discharge gas stream, and wherein the second jet pump assembly is configured to establish a second discrete pump configuration to produce the second discharge gas stream, and wherein the jet pump system is configured to mix the first discharge gas stream and the second discharge gas stream to produce a mixed gas; and control circuitry configured to receive a signal indicative of a fluid parameter of the mixed gas, wherein the control circuitry is configured to cause the jet pump system to alter at least one of the first mix proportion or the second mix proportion based on the signal by at least one of: causing the first jet pump assembly to transition from the first discrete pump configuration to a third discrete pump configuration, or causing the second jet pump assembly to transition from the second discrete pump configuration to a fourth discrete pump configuration.

Example 42: The system of example 41, wherein: the control circuitry is configured to determine a setpoint for the fluid parameter, the control circuitry is configured to compare the fluid parameter indicated by the signal with the setpoint and cause the jet pump system to alter the at least one of the first mix proportion or the second mix proportion based on the comparison.

Example 43: The system of example 41 or example 42, wherein the control circuitry is configured to receive a load signal from a load configured to receive the mixed gas, and wherein the control circuitry is configured to determine the setpoint based on the load signal.

Example 44: A method, comprising: receiving, by a jet pump system, a lower pressure gas from a lower pressure stage of a turbine engine and a higher pressure gas from a higher pressure stage of the turbine engine; combining, using a first jet pump assembly of the jet pump system, a first portion of the lower pressure gas and a first portion of the higher pressure gas to produce a first discharge gas stream having a first mix proportion; combining, using a second jet pump assembly of the jet pump system, a second portion of the lower pressure gas and a second portion of the higher pressure gas to produce a second discharge gas stream having a second mix proportion; mixing, using the jet pump system, the first discharge gas stream and the second discharge gas stream to produce a mixed gas; receiving, by control circuitry, a signal indicative of a fluid parameter of the mixed gas; and altering, using the control circuitry, at least one of the first mix proportion or the second mix proportion based on the signal.

Example 45: The method of example 44, further comprising: receiving, by the control circuitry, a load signal from a load configured to receive the mixed gas; and determining, by the control circuitry, a setpoint for the mixed gas based on the load signal.

Various examples have been described. These and other examples are within the scope of the following claims.

What is claimed is:

1. A system comprising:
a jet pump system configured to receive a lower pressure gas from a lower pressure stage of a turbine engine and receive a higher pressure gas from a higher pressure stage of the turbine engine, the jet pump system comprising:
a first jet pump assembly configured to combine a first portion of the lower pressure gas and a first portion of the higher pressure gas to produce a first discharge gas stream, wherein the first jet pump assembly is configured to alter a first mix proportion of the first portion of the higher pressure gas to the first portion of the lower pressure gas combined to produce the first discharge gas stream, and
a second jet pump assembly configured to combine a second portion of the lower pressure gas and a second portion of the higher pressure gas to produce a second discharge gas stream, wherein the second jet pump assembly is configured to alter a second mix proportion of the second portion of the higher pressure gas to the second portion of the lower pressure gas combined to produce the second discharge gas stream,
wherein the jet pump system is configured to mix the first discharge gas stream and the second discharge gas stream to produce a mixed gas; and
control circuitry configured to receive a signal indicative of a fluid parameter of the mixed gas, wherein the control circuitry is configured to cause the jet pump system to alter at least one of the first mix proportion or the second mix proportion based on the signal.

2. The system of claim 1, wherein at least the first jet pump assembly is configured to establish one or more discrete pump configurations, and wherein the control circuitry is configured to cause the first jet pump assembly to establish one of the one or more discrete pump configurations based on the signal.

3. The system of claim 2, wherein each discrete pump configuration establishes a defined flow area within the first jet pump assembly, and wherein the first jet pump assembly is configured to cause the first portion of the higher pressure gas to flow through the defined flow area.

4. The system of claim 2, wherein the first jet pump assembly includes a translating member and a nozzle body, and wherein the first jet pump assembly is configured to establish each discrete pump configuration by positioning the translating member at a specific position relative to the nozzle body.

5. The system of claim 2,
wherein the second jet pump assembly is configured to establish one or more second discrete pump configurations, and
wherein the control circuitry is configured to cause the second jet pump assembly to establish one of the one or more second discrete pump configurations based on the signal.

6. The system of claim 1, wherein the control circuitry is configured to determine a setpoint for the fluid parameter, and wherein the control circuitry is configured to compare the fluid parameter indicated by the signal with the setpoint and cause the jet pump system to alter the at least one of the first mix proportion or the second mix proportion based on the comparison.

7. The system of claim 6, wherein the control circuitry is configured to receive a load signal from a load configured to receive the mixed gas, and wherein the control circuitry is configured to determine the setpoint based on the load signal.

8. The system of claim 1, further comprising a load configured to receive the mixed gas, wherein the control circuitry is configured to cause the jet pump system to alter the at least one of the first mix proportion or the second mix proportion when the load receives the mixed gas.

9. The system of claim 8, wherein the load comprises one or more of: an environmental control system configured to provide air to a cabin and enable a heat transfer between the mixed gas and the air, an air drive unit configured to pressurize a hydraulic system using the mixed gas, an anti-icing system configured to cause the removal of ice from an aircraft wing, a tank system, or a pneumatic system configured to receive the mixed gas.

10. The system of claim 1, further comprising a sensor configured to sense the fluid parameter of the mixed gas, wherein the sensor is configured to communicate the signal to the control circuitry.

11. The system of claim 1,
wherein the first jet pump assembly is configured to establish a first discrete pump configuration to produce the first discharge gas stream,
wherein the second jet pump assembly is configured to establish a second discrete pump configuration to produce the second discharge gas stream, and
wherein the control circuitry is configured to cause the jet pump system to alter a system mixing ratio by at least one of: causing the first jet pump assembly to transition from the first discrete pump configuration to a third discrete pump configuration, or causing the second jet pump assembly to transition from the second discrete pump configuration to a fourth discrete pump configuration.

12. The system of claim 1, wherein the jet pump system includes one or more diffusers configured to expand at least a portion of the mixed gas, and wherein the signal is indicative of a fluid parameter of the expanded portion of the mixed gas.

13. The system of claim 1, wherein the jet pump system is configured to issue a flow of the mixed gas in an upstream direction to one or more gas loads configured to receive the mixed gas, and wherein the signal is indicative of a fluid parameter of the mixed gas downstream of the one or more gas loads.

14. The system of claim 1, further comprising a device configured to exert a mechanical force on at least the first jet pump assembly to cause the first jet pump assembly to alter the first mix proportion, wherein the device is configured to exert the mechanical force on the first jet pump assembly in response to a control signal, and wherein the control circuitry is configured to communicate the control signal to the device.

15. The system of claim 1, further comprising the turbine engine, wherein the turbine engine is configured to increase a pressure of a gas stream as the gas stream flows from an initial compressor stage to a penultimate compressor stage to a final compressor stage, wherein the penultimate compressor stage is configured to issue a compressed gas to the final compressor stage, wherein the final compressor stage is configured to issue the compressed gas to a combustion chamber, and wherein the system is configured to provide the higher pressure gas from the gas stream prior to the gas stream flowing to one of the penultimate compressor stage or the final compressor stage.

16. A system comprising:
a jet pump system configured to receive a lower pressure gas from a lower pressure stage of a turbine engine and receive a higher pressure gas from a higher pressure stage of the turbine engine, the jet pump system comprising:
a first jet pump assembly configured to combine a first portion of the lower pressure gas and a first portion of the higher pressure gas to produce a first discharge gas stream, wherein the first jet pump assembly is configured to alter a first mix proportion of the first portion of the higher pressure gas to the first portion of the lower pressure gas combined to produce the first discharge gas stream, and wherein the first jet pump assembly is configured to establish a first discrete pump configuration to produce the first discharge gas stream, and
a second jet pump assembly configured to combine a second portion of the lower pressure gas and a second portion of the higher pressure gas to produce a second discharge gas stream, wherein the second jet pump assembly is configured to alter a second mix proportion of the second portion of the higher pressure gas to the second portion of the lower pressure gas combined to produce the second discharge gas stream, and wherein the second jet pump assembly is configured to establish a second discrete pump configuration to produce the second discharge gas stream,
wherein the jet pump system is configured to mix the first discharge gas stream and the second discharge gas stream to produce a mixed gas; and
control circuitry configured to receive a signal indicative of a fluid parameter of the mixed gas, wherein the control circuitry is configured to cause the jet pump system to alter at least one of the first mix proportion or the second mix proportion based on the signal by at least one of:
causing the first jet pump assembly to transition from the first discrete pump configuration to a third discrete pump configuration, or
causing the second jet pump assembly to transition from the second discrete pump configuration to a fourth discrete pump configuration.

17. The system of claim 16, wherein:
the control circuitry is configured to determine a setpoint for the fluid parameter, and
the control circuitry is configured to compare the fluid parameter indicated by the signal with the setpoint and cause the jet pump system to alter the at least one of the first mix proportion or the second mix proportion based on the comparison.

18. The system of claim 17, wherein the control circuitry is configured to receive a load signal from a load configured to receive the mixed gas, and wherein the control circuitry is configured to determine the setpoint based on the load signal.

19. A method, comprising:
receiving, by a jet pump system, a lower pressure gas from a lower pressure stage of a turbine engine and a higher pressure gas from a higher pressure stage of the turbine engine;

combining, using a first jet pump assembly of the jet pump system, a first portion of the lower pressure gas and a first portion of the higher pressure gas to produce a first discharge gas stream having a first mix proportion;

combining, using a second jet pump assembly of the jet pump system, a second portion of the lower pressure gas and a second portion of the higher pressure gas to produce a second discharge gas stream having a second mix proportion;

mixing, using the jet pump system, the first discharge gas stream and the second discharge gas stream to produce a mixed gas;

receiving, by control circuitry, a signal indicative of a fluid parameter of the mixed gas; and altering, using the control circuitry, at least one of the first mix proportion or the second mix proportion based on the signal.

20. The method of claim 19, further comprising:

receiving, by the control circuitry, a load signal from a load configured to receive the mixed gas; and determining, by the control circuitry, a setpoint for the mixed gas based on the load signal.

* * * * *